United States Patent [19]
Murayama et al.

[11] Patent Number: 5,200,201
[45] Date of Patent: Apr. 6, 1993

[54] APPARATUS FOR FORMING PLASTIC GRIP MEMBER OF CONTAINER CLOSURE

[75] Inventors: Kashiwa Murayama, Fujisawa; Masakazu Tatsuta, Hiratsuka; Yoshiharu Shibata, Hiratsuka; Hideki Yajima, Hiratsuka; Yuji Kano, Chigasaki; Tateo Kubo, Hiratsuka; Kinji fuchie, Tokorozawa; Hiroshi Sato, Hiratsuka, all of Japan

[73] Assignee: Toyo Seikan Kaisha, Ltd., Tokyo, Japan

[21] Appl. No.: 747,705

[22] Filed: Aug. 20, 1991

[30] Foreign Application Priority Data

Sep. 7, 1990 [JP] Japan .................. 2-235592
Jan. 24, 1991 [JP] Japan .................. 3-22645

[51] Int. Cl.$^5$ .................. B29C 45/06; B29C 45/14
[52] U.S. Cl. .................. 425/117; 425/127; 425/129.1; 425/576
[58] Field of Search .................. 425/116, 126.1, 117, 425/577, 127, 129.1, 398, 348 R, 348 S, 350, 576, 116, 117, 127, 129.1; 220/269, 270; 264/273, 274

[56] References Cited

U.S. PATENT DOCUMENTS

| | | | |
|---|---|---|---|
| 3,187,928 | 6/1965 | Bozek | 220/54 |
| 4,038,359 | 7/1977 | Pendleton | 264/263 |
| 4,084,722 | 4/1978 | Rosynek et al. | 220/270 |
| 4,448,325 | 5/1984 | Edwards et al. | 220/269 |
| 4,489,018 | 12/1984 | Ball | 264/25 |
| 4,738,606 | 4/1988 | Chrisitiansen et al. | 425/127 |
| 4,786,027 | 11/1988 | Stalter | 249/56 |
| 4,804,104 | 2/1989 | Moen | 220/269 |
| 4,865,793 | 9/1989 | Suzuki et al. | 264/278 |
| 5,059,106 | 10/1991 | Joseph | 425/125 |

FOREIGN PATENT DOCUMENTS

57-178730 4/1982 Japan.
63-302010 8/1988 Japan.

Primary Examiner—Willard Hoag
Attorney, Agent, or Firm—Beveridge, DeGrandi, Weilacher & Young

[57] ABSTRACT

A molding system for molding a plastic grip member and, at the same time, linking it to a linking protruding piece of a container closure body. The molding system comprises a rotary container closure body conveyor apparatus and a compression molding apparatus. The container closure body conveyor apparatus is provided with a rotary disc that has a plurality of container closure body-receiving portions formed therein and a rotation preventing mechanism that prevents the rotation of the container closure bodies held in the receiving portions. The compression molding apparatus has a mold constituted by a first mold portion and a second mold portion. The first mold portion includes a moving member that moves between a mold position and a separated position. The moving member has a supporting surface for supporting the skirt wall of the container closure body and a support projection for supporting the linking protruding piece of the container closure body. A moving member-moving mechanism is disposed to selectively move the moving member to the mold position or to the separated position.

13 Claims, 16 Drawing Sheets

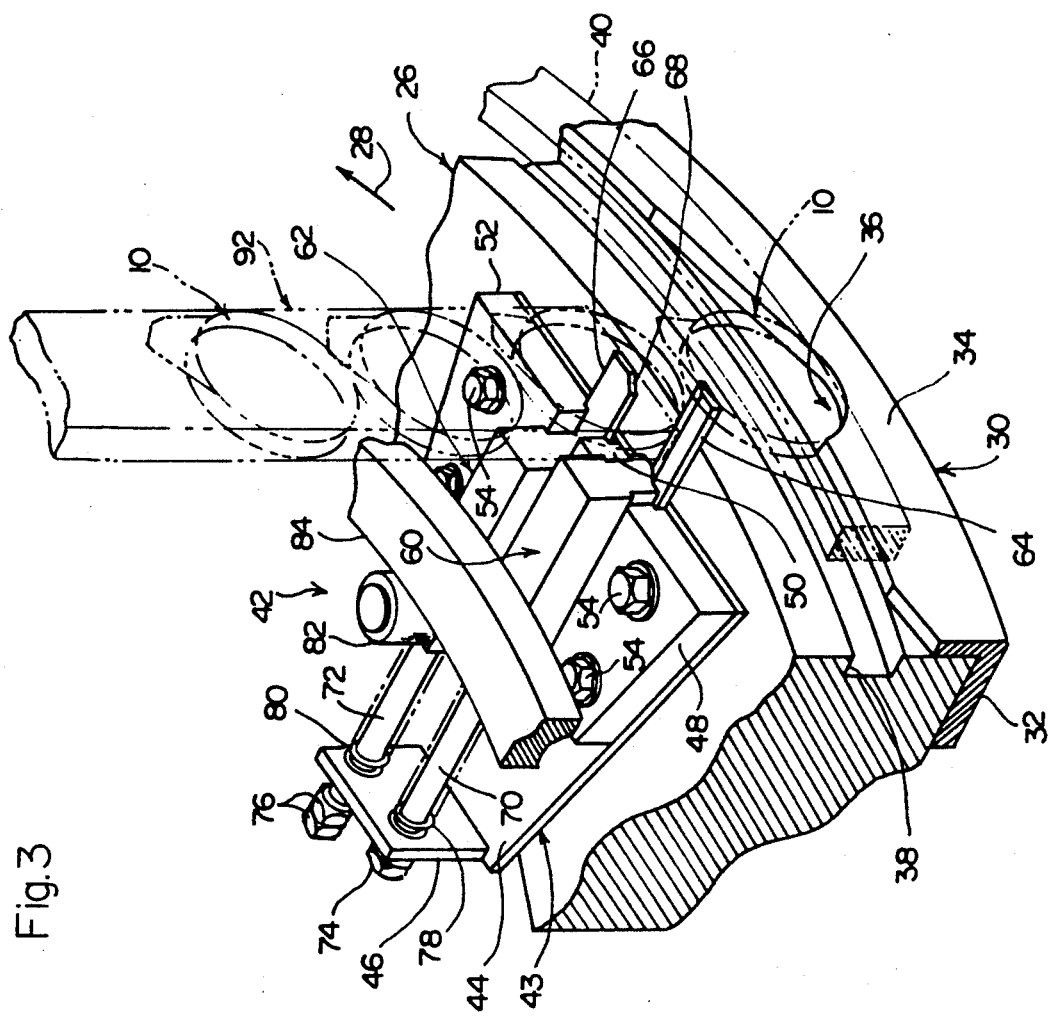
Fig.3
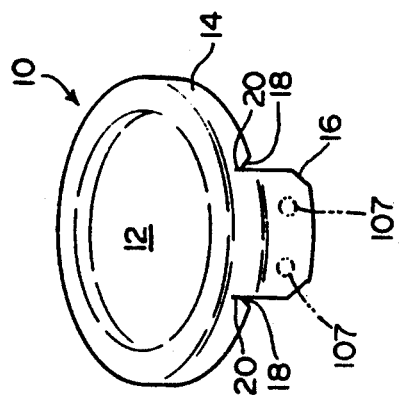
Fig.2-A
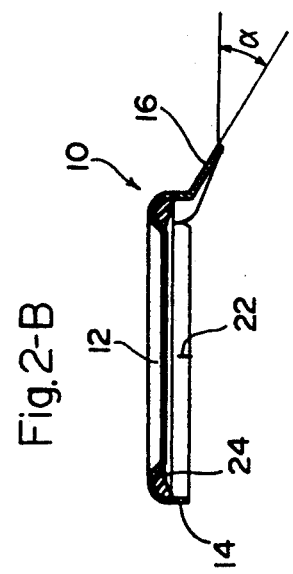
Fig.2-B

Fig. 9-A
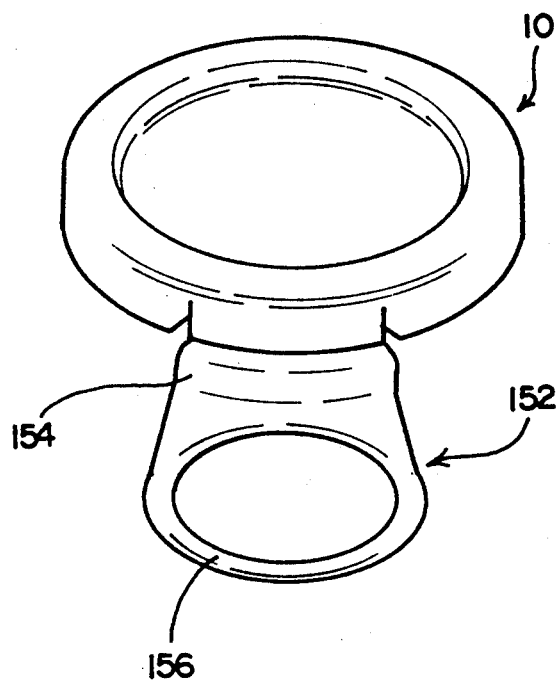
Fig. 9-B
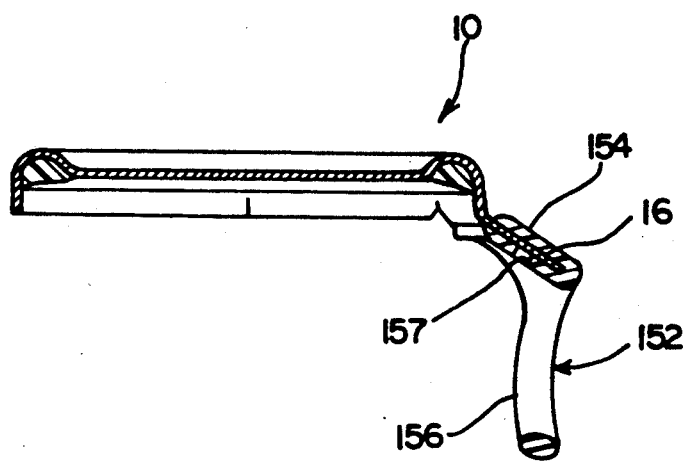

APPARATUS FOR FORMING PLASTIC GRIP MEMBER OF CONTAINER CLOSURE

FIELD OF THE INVENTION

The present invention relates to a molding system for forming a plastic grip member and, at the same time, linking it integrally to a linking protruding piece of a container closure body, as well as to a container closure produced by the above molding system.

DESCRIPTION OF THE PRIOR ART

Japanese Laid-Open Patent Publication No. 178730/1982 laid open Nov. 4, 1982 discloses a container closure comprised of a metallic container closure body and a plastic grip member as a suitable example of a simple openable container closure. The container closure body is made of a suitable thin metallic plate such as a thin plate of an aluminum-base alloy or a thin chromate-treated steel plate, and has a circular top panel wall, a skirt wall extending downwardly from the peripheral edge of the top panel wall, and a linking protruding piece protruding from the lower end of the skirt wall. The plastic grip member molded from a suitable plastic material such as a polyethylene or a polypropylene has a linking base portion which surrounds at least the free end of the linking protruding piece of the container body and a ring portion that extends in the form of a ring from the linking base portion.

Japanese Laid-Open Patent Publication No. 302010/1988 laid open Dec. 8, 1988 discloses a molding system for molding a plastic grip member and, at the same time, linking it integrally to a linking protruding piece of a container closure body. This molding system comprises a compression molding apparatus and a rotary container closure body conveyor apparatus for introducing container closure bodies into the compression molding apparatus.

The rotary container closure body conveyor apparatus is equipped with a rotary disc that rotates on a central axis extending substantially vertically. On the outer peripheral surface of the rotary disc are formed a plurality of container closure body-receiving portions at intervals in the circumferential direction. The container closure body is conveyed by the rotation of the rotary disc with its linking protruding piece being upwardly faced and with its top panel wall and skirt wall being at least partly held by the container closure body-receiving portion.

The compression molding apparatus is equipped with a mold consisting of a first mold portion and a second mold portion which are opened and closed by being moved relative to each other in the predetermined opening and closing directions. The first mold portion has an accommodation space and a first mold cavity. The second mold portion has a second mold cavity and a through introduction hole that extends in a predetermined direction from the second mold cavity, and a compression rod is slidably inserted in the through introduction hole. The first mold cavity and the second mold cavity define a mold space in cooperation with each other. The container closure body is accommodated in the accommodation space of the first mold portion, and at least a free end of the linking protruding piece of the container closure body protrudes into the mold space The heat-molten plastic material is fed to the through introduction hole in the second mold portion, compressed by the compression rod and is compression-molded into a grip member having a shape corresponding to the mold space.

However, the rotary container closure body conveyor apparatus in the conventional molding system has the problem that must be solved. That is, when the container closure body held in the container closure body-receiving portion is conveyed by the rotation of the rotary disc, it rotates to some extent on the central axis of the top panel wall and skirt wall as a center, so that it becomes difficult to introduce the container closure into the compression molding apparatus as desired.

Moreover, the compression molding apparatus in the conventional molding system has the following problems that must be solved. First, when the mold is opened after the plastic grip member is compression-molded, the molded grip member is separated away from the second mold portion and is placed on the first mold portion together with the container closure body. It is therefore necessary to discharge the molded grip member together with the container closure body from the first mold portion after the mold is opened. At the time when the mold is opened, however, the grip member remains partly buried in the first mold cavity of the first mold portion; i.e., it is not easy to quickly discharge the grip member together with the container closure body from the first mold portion. Further, the experience of the present inventors tells that the grip member is often undesirably deformed when it is discharged from the first mold portion.

Second, according to the experience of the present inventors, the plastic material flows into the mold space from the through introduction hole of the second mold portion and comes into collision with one surface of the linking protruding piece of the container closure body to urge it, whereby the linking protruding piece is pressed onto the bottom surface of the first mold cavity inhibiting the plastic material from flowing in sufficient amounts into the other surface side of the linking protruding piece. In consequence, the plastic material covering the other surface of the linking protruding piece tends to become very thin, or the other surface of the linking protruding piece be locally exposed. Should that happen, the grip member loses linking strength relative to the container closure body, the container closure loses appearance, and defective container closure that is not acceptable as a product is produced.

SUMMARY OF THE INVENTION

A first object of the present invention is to improve the rotary container closure body conveyor apparatus in the molding system and to reliably prevent the container closure body held in the container closure body-receiving portion from rotating during conveying without causing any inconvenience in conveying the container closure bodies.

A second object of the present invention is to improve the compression molding apparatus in the molding system and to very quickly discharge the grip member integrally linked to the linking protruding piece, together with the container closure body, from the first mold portion, without causing undesired deformation after the mold is opened.

A third object of the present invention is to improve the compression molding apparatus in the molding system and to flow the plastic material in sufficient amounts into the other surface side of the linking protruding piece of the container closure body at the time of compression-molding the plastic material so that the formation of defective container closures can be reliably prevented.

A fourth object of the present invention is to provide an excellent container closure in which the plastic grip member is linked fully strongly to the linking protruding piece of the metallic container closure body and which is free from defect in appearance.

In order to achieve the above first object, the present invention is to provide a molding system for forming a plastic grip member and, at the same time, linking it integrally to a protruding piece of a container closure body that has a circular top panel wall, a cylindrical skirt wall extending downwardly from the peripheral edge of said top wall and said protruding piece protruding from the lower edge of said skirt wall, said molding system comprising:

a rotary container closure body conveyor apparatus for conveying said container closures; wherein said rotary container closure body conveyor apparatus is comprised of a rotary disc that rotates on a central axis extending substantially vertically and has a plurality of container closure body-receiving portions formed on the outer peripheral surface thereof at a distance in the circumferential direction, and a rotation preventing mechanism which prevents the container closure bodies held in the receiving portions from rotating therein;

each of said receiving portions formed in said rotary disc is capable of at least partly holding the top panel wall and the skirt wall of the container closure body which is so placed that the protruding piece thereof is directed upwards;

said rotation preventing mechanism includes a pair of locking pieces disposed on said rotary disc in relation to each of said receiving portions, and each of said pair of locking pieces is constituted by an upstream-side locking piece having a tip that can be positioned being faced to one side edge of the protruding piece of the container closure body on the upstream side of said rotary disc in the direction of rotation thereof and a downstream-side locking piece having a tip that can be positioned being faced to the other side edge of the protruding piece of the container closure body on the downstream side of said rotary disc in the direction of rotation thereof; and at least said downstream-side locking pieces of said pair of locking pieces are mounted on said rotary disc in a manner to freely move between an acting position at which the tips thereof are positioned being faced to the one side edge of the protruding piece of said container closure body and a retreated position at which the tips thereof are separated away from the protruding piece of said container closure body, and said rotation preventing mechanism further includes a downstream-side locking piece positioning mechanism that selectively positions said downstream-side locking pieces at said acting position and at said retreated position.

In order to achieve the above second object, the present invention is to provide a molding system for forming a plastic grip member and, at the same time, linking it integrally to a protruding piece of a container closure body that has a circular top panel wall, a cylindrical skirt wall extending downwardly from the peripheral edge of said top wall and said protruding piece protruding from the lower edge of said skirt wall, said molding system comprising:

a compression molding apparatus equipped with a mold which consists of a first mold portion and a second mold portion that are opened and closed by being moved relative to each other in the predetermined opening and closing directions; wherein said first mold portion has an accommodation space and a first mold cavity;

said second mold portion has a second mold cavity;

said first mold cavity and said second mold cavity in cooperation define a mold space for forming a plastic grip member;

when the container closure body is accommodated in said accommodation space of said first mold portion, at least a free end of the linking protruding piece of said container closure body is protruded into said mold space;

said first mold portion is constituted by a mold member that has said first mold cavity formed therein and a moving member that is mounted thereon to freely move between a mold position and a separated position in said opening and closing directions, said moving member having formed thereon a supporting surface that supports at least a portion of said skirt wall of said container closure body;

said compression molding apparatus has a moving member-moving mechanism that selectively positions said moving member of said first mold portion at said mold position or at said separated position; and said grip member is compression-molded while said moving member of said first mold portion is located at said mold position, and when said first mold portion and said second mold portion are opened relatively to each other, simultaneously or subsequently said moving member is moved to said separated position, so that the resultant molded grip member is separated from said first mold cavity.

According to a preferred embodiment of the molding system, a through introduction hole extending in a predetermined direction from said second mold cavity is formed in said second mold portion, the compression rod is slidably inserted in said through introduction hole, the plastic material fed to said through introduction hole is compressed by the compression rod and is molded into the grip member having a shape corresponding to said mold space, and said moving member of said first mold portion has formed thereon a support projection that protrudes into said first mold cavity even at said molding position to support said linking protruding piece of said container closure body in a manner to separate it away from the bottom surface of said first mold cavity, thereby to accomplish the aforementioned third object.

Moreover, in order to achieve the above third object, the present invention is to provide a molding system for forming a plastic grip member and, at the same time, linking it integrally to a protruding piece of a container closure body that has a circular top panel wall, a cylindrical skirt wall extending downwardly from the peripheral edge of said top wall and said protruding piece protruding from the lower edge of said skirt wall, said molding system comprising:

a compression molding apparatus equipped with a mold which consists of a first mold portion and a second mold portion that are opened and closed by being moved relative to each other in the predetermined opening and closing directions; wherein said first mold portion has an accommodation space and a first mold cavity;

said second mold portion has a second mold cavity and a through introduction hole that extends in a predetermined direction from said second mold cavity, and a compression rod is slidably inserted in said through introduction hole;

said first mold cavity and said second mold cavity in cooperation define a mold space for forming a plastic grip member;

when the container closure body is accommodated in said accommodation space of said first mold portion, at least a free end of the linking protruding piece of the container closure body is protruded into said mold space;

the plastic material fed into said through introduction hole is compressed by said compression rod and is molded into the grip member having a shape corresponding to said mold space; and said first mold cavity of said first mold portion has formed thereon at least one support projection that protrudes into said mold space to support the linking protruding piece in a manner to separate is away from the bottom surface of said first mold cavity.

In order to achieve the above fourth object, the present invention is to provide a container closure comprising a metallic container closure body and a plastic grip member, said container closure body having a circular top panel wall, a cylindrical skirt wall extending downwardly from the peripheral edge of said top panel wall, and a linking protruding piece that protrudes from the lower edge of said skirt wall, said grip member having a linking base portion that surrounds at least the free end of said linking protruding piece and a ring portion that extends from said linking base portion, and said linking base portion having a hole formed in the lower surface thereof leading to the lower surface of said linking protruding piece.

According to a preferred embodiment of the container closure, said linking protruding piece has at least one hole through which the plastic material for forming said grip member flows, and the hole of said linking base portion is offset with respect to said hole of said linking protruding piece.

Other objects and various technical advantages obtained according to the present invention will become apparent from the following detailed description of preferred embodiments of the invention taken in conjunction with the accompanying drawings.

BRIEF DESCRIPTION OF THE DRAWINGS

FIGS. 2-A and 2-B are a perspective view and a sectional view illustrating a container closure body;

FIG. 3 is a partial perspective view illustrating a portion of the first rotary container closure body conveyor apparatus in the molding system of FIG. 1;

FIGS. 9-A and 9-B are a perspective view and a sectional view showing the container closure having the container closure body and a plastic grip member linked to a linking protruding piece thereof;

DETAILED DESCRIPTION OF THE PREFERRED EMBODIMENTS

Preferred embodiments of the molding system constituted according to the present invention will now be described in detail with reference to the accompanying drawings.

Figure 1:
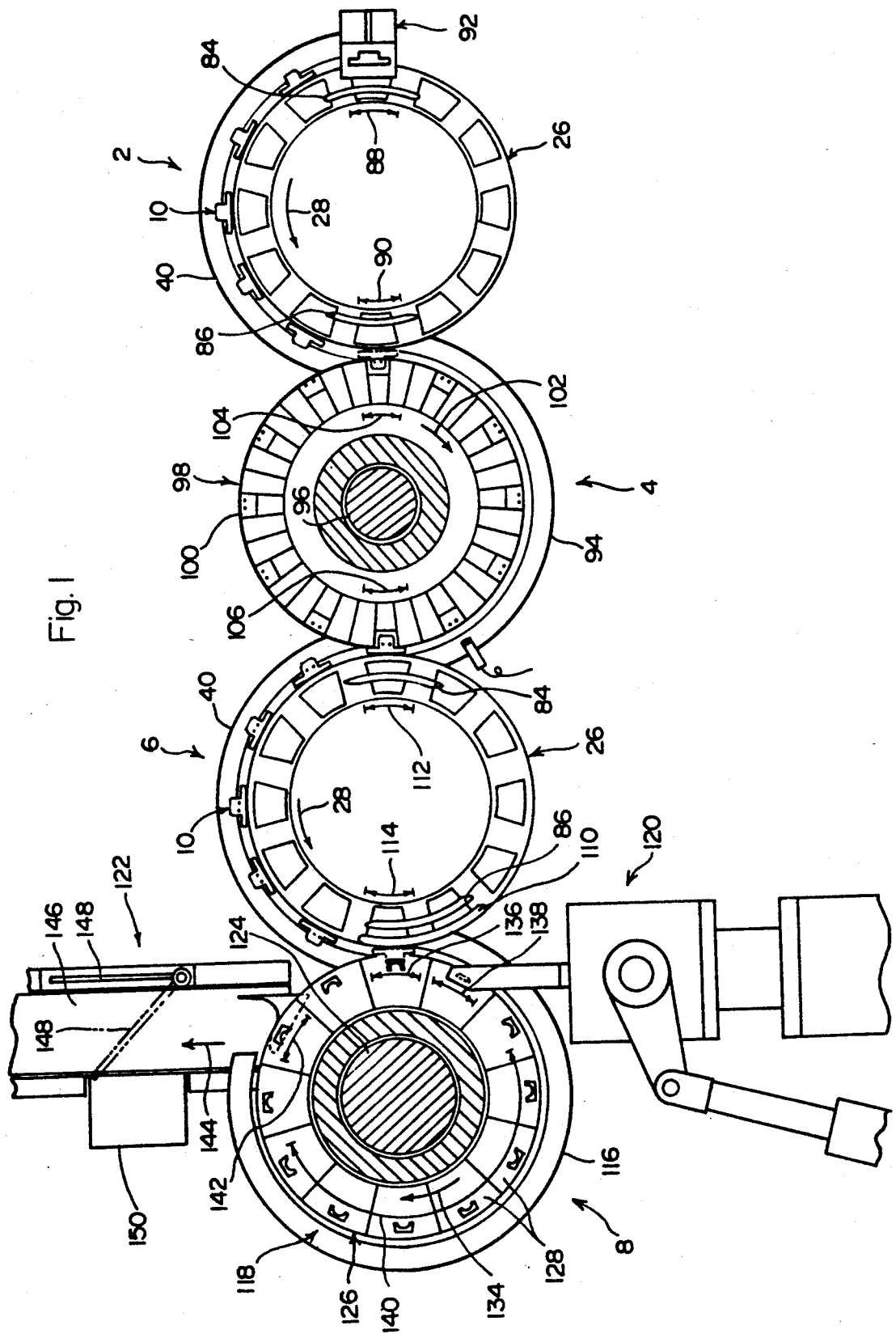
FIG. 1 is a schematic lateral sectional view showing a molding system, equipped with two rotary container closure body conveyor apparatuses and one compression molding apparatus, constituted according to an embodiment of the present invention.

FIG. 1 shows the molding system comprised of a first rotary container closure body conveyor apparatus 2, a piercing device 4, a second rotary container closure body conveyor apparatus 6 and a compression molding apparatus 8.

FIGS. 2-A and 2-B show one example of a container closure body 10 that is introduced into the piercing device 4 from the conveyor apparatus 2. The container closure body 10 that can be made of a suitable thin metallic plate such as a thin aluminum-base alloy plate, a thin chromate-treated steel plate or a thin tin plate has a circular top panel wall 12, a cylindrical skirt wall 14 extending downwardly from the peripheral edge of the top panel wall 12, and a linking protruding piece 16 protruding from the lower end of the skirt wall 14. Desirably, the protruding piece 16 protrudes outwardly in the radial direction from the lower end of the skirt wall 14 with a downward inclination of an angle α which may be about 15 to about 60 degrees. Notches 18 of nearly a triangular shape are formed in the skirt wall 14 on both sides at the base end of the protruding piece 16, and breakable lines 20 are formed extending upwards from the notches 18. In addition, breakable lines 22 are formed extending upwards from the lower end of the skirt wall 14 at positions angularly spaced by an angle of about 90 degrees from the center of the protruding piece 16 on both sides in the circumferential direction. The breakable lines 20 and 22 may be so-called scores or slits. The peripheral edge of the top panel wall 12 is upwardly swollen, and a plastic annular liner 24 is disposed on the inside surface of the swollen portion.

The first rotary container closure body conveyor apparatus 2 will be described with reference to FIG. 3 together with FIG. 1. The conveyor apparatus 2 which is diagramed is equipped with a rotary disc 26 that is mounted to rotate on a central axis extending substantially vertically (perpendicularly to the surface of the paper in FIG. 1). The rotary disc 26 which may be of an annular form is continuously rotated in a direction indicated by arrow 28 by a suitable drive source (not shown) which may be an electric motor. As clearly shown in FIG. 3, an additional member 30 is fixed to the outer periphery of the rotary disc 26 by a suitable fixing means (not shown) such as clamping bolts. The additional member 30 has a horizontal annular portion 32 that extends along the lower surface of the rotary disc 26 and an upright annular portion 34 that extends along the lower half portion of the outer peripheral surface of the rotary disc 26. Container closure body-receiving portions 36 are formed in the upright annular portion 34 of the additional member 30 at an equal distance in the circumferential direction. Each container closure body-receiving portion 36 is constituted by a cavity having an open upper surface, and has a bottom surface of an arcuate shape over an angle range of about 90 degrees on the half of the upstream side as viewed in the direction of rotation of the rotary disc 26 indicated by arrow 28, and further has a bottom surface on the half of the downstream side that upwardly extends from the lowermost end of the half of the upstream side tangentially in relation to the arcuate shape. In the diagramed embodiment, the container closure body-receiving portions 36 are formed in the additional member 30 from a standpoint of easiness in construction. If desired, however, it is allowable to form the container closure body-receiving portions 36 in the outer peripheral surface of the rotary disc 26 itself. An annular groove 38 is formed in the outer peripheral surface of the rotary disc 26, the annular groove 38 continuously extending in the circumferential direction over the upper end of the upright annular portion 34 of the additional member 30. The conveyor apparatus 2 is provided with a stationary guide 40 that extends arcuately along the outer peripheral surface of the rotary disc 26 on the outside thereof.

Figure 4:
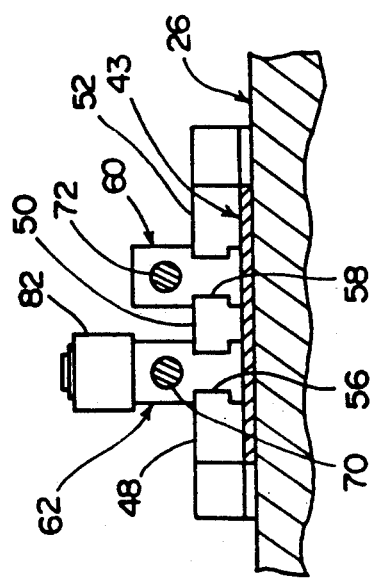
FIG. 4 is a partial vertical section view illustrating a portion of the first rotary container closure body conveyor apparatus of FIG. 3.

It is important that the conveyor apparatus 2 improved according to the present invention is equipped with a rotation preventing mechanism 42 in addition to the above-mentioned constitution. With reference to FIG. 3, a mounting member 43 is disposed on the upper surface of the rotary disc 26 to correspond to each of the container closure body-receiving portions 36. The mounting member 43 has a fan-shaped horizontal portion 44 and an upright portion 46 that upwardly extends from the inner end of the horizontal portion 44 in the radial direction. Three guide blocks 48, 50 and 52 are disposed on the outer side portion of the horizontal portion 44 in the radial direction. The mounting member 43 and the guide blocks 48, 50 and 52 are fastened to predetermined positions by screwing bolts 54 to the rotary disc 26 through them. As will be clearly understood by reference to FIG. 4 together with FIG. 3, a guide groove 56 having nearly an inverted T-shape in cross section is defined between the guide block 48 and the guide block 50, and a guide groove 58 having nearly an inverted T-shape in cross section is defined between the guide block 50 and the guide block 52. These guide grooves 56 and 58 extend in parallel with each other nearly in the radial direction (reference should also be made to FIGS. 5 and 6). A slide block 60 is slidably inserted in the guide groove 56, and a slide block 62 is slidably inserted in the guide groove 58. An upstream-side locking piece 64 is formed integrally at the front end of the slide block 60 to protrude outwardly in the radial direction, and a downstream-side locking piece 66 is formed integrally at the front end of the slide block 62 to protrude outwardly in the radial direction. The upstream-side locking piece 64 and the downstream-side locking piece 66 have nearly a rectangular shape but an upstream-side edge 68 at the tip of the downstream-side locking piece 66 should desirably be tilted on the downstream side towards the tip. A rod 70 is integrally formed at the rear end of the slide block 60 to inwardly extend in the radial direction, and a rod 72 is integrally formed at the rear end of the slide block 62 to inwardly extend in the radial direction. The rear end of the rod 70 rearwardly protrudes through an opening formed in the upright portion 46 of the molding member 43, and nuts 74 are fitted to the rear end. Similarly, the rear end of the rod 72 rearwardly protrudes through an opening formed in the upright portion 46 of the mounting member 43, and nuts 76 are fitted to the rear end. Moreover, a compression coil spring 78 is fitted onto the rod 70 between the upright portion 46 of the mounting member 43 and the main portion of the slide block 60, and a compression coil spring 80 is fitted onto the rod 72 beteen the upright portion 46 of the mounting member 43 and the main portion of the slide block 62. The compression coil spring 78 constitutes a resiliently urging means which outwardly urges the slide block 60 in the radial direction, in order to resiliently urge the upstream-side locking piece 64 toward the diagramed acting position (at which the nut 74 is brought into contact with the upright portion 46 of the mounting member 43, and the slide block 60 is prevented from further moving outwardly in the radial direction). The compression coil spring 80 constitutes a resiliently urging means to urge the slide block 62 outwardly in the radial direction, in order to resiliently urge the downstream-side locking piece 66 toward the acting position shown in FIG. 6 (at which the nut 76 is brought into contact with the upright portion 46 of the mounting member 43, and the slide block 62 is prevented from further moving outwardly in the radial direction). In the first rotary container closure body conveyor apparatus 2 as will become apparent from the description given later, the upstream-side locking piece 64 needs not be moved from the acting position and, hence, the slide block 60 may not be slidably mounted but may be fixed at a predetermined position (in the diagramed embodiment, however, the slide block 60 is slidably mounted for the purpose that the parts constituting the first rotary container closure body conveyor apparatus 2 can be used in common with the parts constituting the second rotary container closure body conveyor apparatus 6 in which it is required to move the upstream-side locking piece between the acting position and the retracted position). As will be further described later, when the upstream side locking piece 64 and the downstream-side locking piece 66 are located at the acting positions, their tips hold the protruding piece 16 of the container closure body 10 accommodated in the container closure body-receiving portion 36; i.e., the upstream-side locking piece 64 is positioned being faced to the upstream-side edge of the protruding piece 16 and the downstream-side locking piece 66 is positioned being faced to the downstream-side edge of the protruding piece 16.

Figure 5:
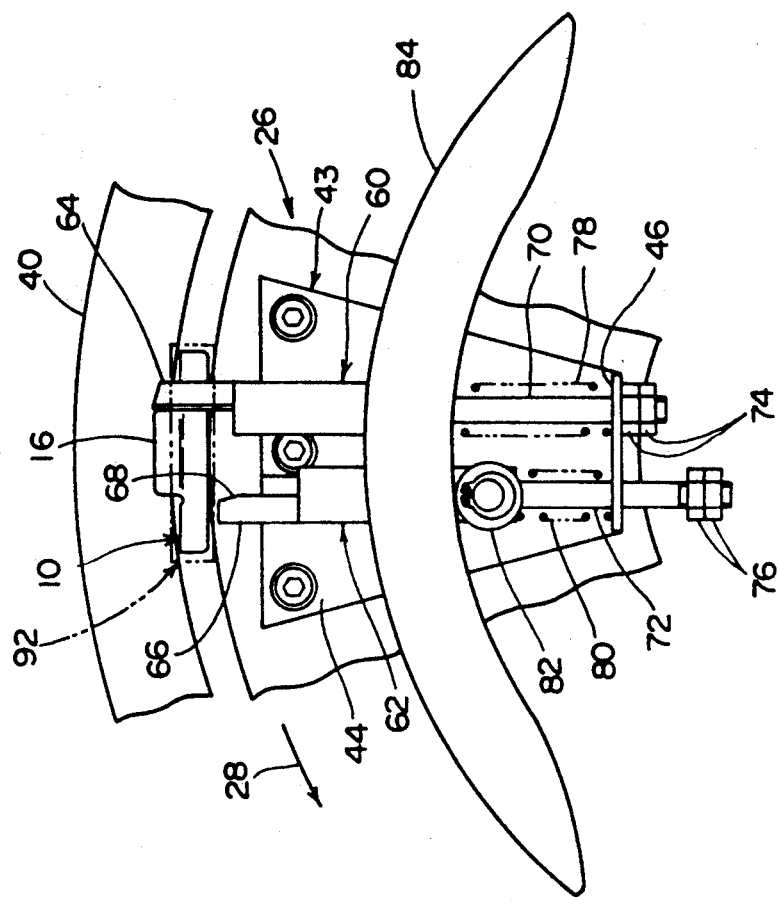
FIGS. 5, 6 and 7 are partial plan views showing a portion of the first rotary container closure body conveyor apparatus of FIG. 3.
Figure 6:
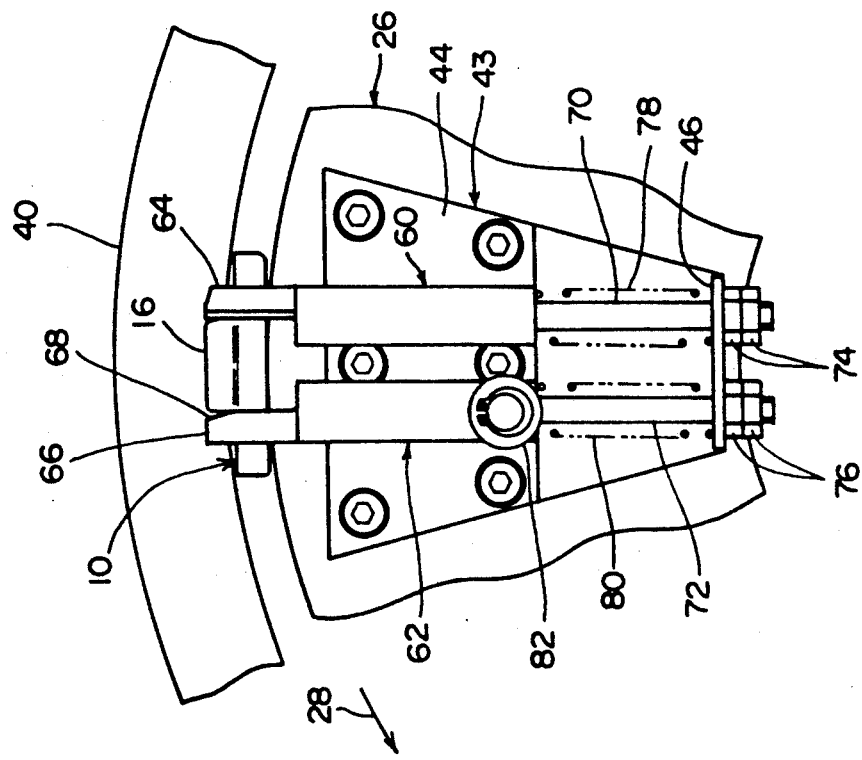

In addition to the pair of locking pieces, i.e., upstream-side locking piece 64 and downstream-side locking piece 66 arranged in relation to each of the container closure body-receiving portions 36, the rotation preventing mechanism 42 includes a cam means that selectively locates the downstream-side locking piece 66 at the retreated position that is shown in FIGS. 3 and 5. The cam means constitutes a downstream-side locking piece positioning mechanism in cooperation with the compression coil spring 80. A cam roller 82 is rotatably provided on the upper surface of the slide block 62 as shown in FIG. 3. As shown in FIGS. 1 and 3, furthermore, two arcuate stationary cams 84 and 86 are disposed above the rotary disc 26 to act upon the cam roller 82. The cams 84 and 86 are supported at required positions above the rotary disc 26 by suitable supporting members (not shown). As will be understood with reference to FIGS. 3 and 5, when the slide block 62 arrives at a required zone, i.e., at a container closure body-receiving zone 88 or a container closure body discharge zone 90 by the rotation of the rotary disc 26, the cams 84 and 86 act upon the cam roller 82 to inwardly urge the slide block 62 in the radial direction against the resiliently urging action of the compression coil spring 80, so that the downstream-side locking piece 66 is located at the retreated position shown in FIGS. 3 and 5. At this retreated position, the tip of the downstream-side locking piece 66 is backwardly separated away from the container closure body-receiving portion 36. In the diagramed embodiment, the downstream-side locking piece 66 (and upstream-side locking piece 64) are resiliently urged toward the acting positions by the compression coil spring 80 (and compression coil spring 78) and are located at the retreated positions by the cam means (cams 84 and 86). If desired, however, it is also allowable to resiliently urge the downstream-side locking piece 66 (and upstream-side locking piece 64) toward the retreated positions using a suitable resiliently urging means and to locate them at the acting positions using the cam means contrary to the above.

The action of the first rotary container closure body conveyor apparatus 2 will now be described with reference to FIGS. 1 to 7. In the container closure body-receiving zone 88, an introduction chute 92 (FIGS. 1, 3 and 5) is hanging down substantially vertically near to the peripheral upper surface of the rotary disc 26, and the container closure body 10 is introduced into the container closure body-receiving portion 36 from the introduction chute 92 at the time when the container closure body-receiving portion 36 provided in the rotary disc 26 passes in the container closure body-receiving zone 88. As shown in FIG. 3, the container closure body 10 is introduced into the container closure body-receiving portion 36 with the inner surface of its top panel wall 12 that is faced outwardly in the radial direction and with its protruding piece 16 that is upwardly directed. Referring to FIGS. 3 and 5, the stationary cam 84 acts upon the cam roller 82 in the container closure body-receiving zone 88 causing the downstream-side locking piece 66 to be located at the retreated position. Therefore, the container closure body 10 gradually moves downwards from the downstream side of the container closure body-receiving portion 36 by the motion of the container closure body-receiving portion 36 in the direction indicated by arrow 28, and enters into the container closure body-receiving portion 36 without interfered by the downstream-side locking piece 66. The upstream-side locking piece 64 is protruded to the acting position, and the downstream-side edge at the tip thereof is positioned being faced to a side edge of the container closure body 10 that has entered into the container closure body-receiving portion 36. The container closure body 10 is introduced as required into the container closure body-receiving portion 36 which then passes through the container closure body-receiving zone 88, whereby the cam roller 82 separates away from the stationary cam 86 and the downstream-side locking piece 66 protrudes into the acting position being resiliently urged by the compression coil spring 78. Then, the upstream-side edge 68 at the tip of the downstream-side locking piece 66 is positioned being faced to the edge on the other side of the protruding piece 16 of the container closure body 10. Thus, the protruding piece 16 of the container closure body 10 is held between the upstream-side locking piece 64 and the downstream-side locking piece 66, and the container closure body 10 is reliably prevented from rotating in the container closure body-receiving portion 36. Even in case the container closure body 10 is rotated to some extent in the clockwise direction as viewed from the outside in the radial direction before the downstream-side lock piece 66 protrudes into the acting position, the upstream-side edge 68 at the tip of the downstream-side locking piece 66 that is tilted on the downstream side toward the tip thereof acts upon the edge on the other side of the protruding piece 16 of the container closure body 10 as the downstream-side lock piece 66 protrudes into the acting position, whereby the container closure body 10 is gradually rotated in the counterclockwise direction and is corrected to the desired angle condition. Referring to FIG. 1, the stationary guide 40 disposed in relation to the rotary disc 26 extends from the upstream side of the container closure body-receiving zone 88 up to the upstream side of the container closure body discharge zone 90, and works to prevent the container closure body 10 from outwardly escaping the container closure body-receiving portion 36 in the radial direction while it is being conveyed from the container closure body-receiving zone 88 up to the container closure body discharge zone 90.

Figure 7:
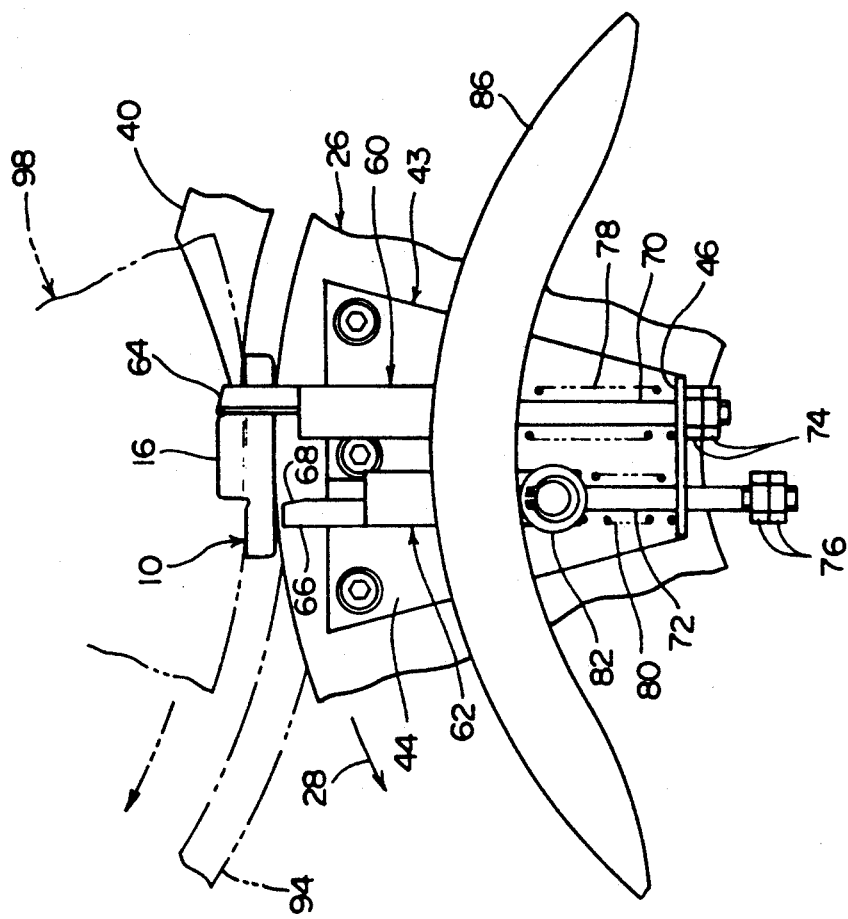

When the container closure body-receiving portion 36 passes at the container closure body discharge zone 90 as will be understood from FIGS. 1 and 7, the stationary cam 86 acts on the cam roller 82 and the downstream-side locking piece 66 is located at the retreated position. Further, the stationary guide 40 disposed in relation to the rotary disc 26 terminates on the upstream side of the container closure body discharge zone 90. In the container closure body discharge zone 90, the upstream-side end of a stationary guide 94 of the piercing device 4 enters into the annular groove 38 of the rotary disc 26, i.e., enters into the rear side of the container closure body 10 held in the container closure body-receiving portion 36. In the container closure body discharge region 90, the upstream-side end of the stationary guide 94 works to forcibly discharge the container closure body 10 outwardly in the radial direction from the container closure body-receiving portion 36 in the rotary disc 26 of the first rotary container closure body conveyor apparatus 2, and to transfer it to the piercing device 4. While the container closure body 10 is being transferred, the upstream-side locking piece 64 continues to protrude to the acting position but the downstream-side locking piece 66 moves to the retreated position. Therefore, transfer of the container closure body 10 is not interfered by the upstream-side locking piece 64 or the downstream-side locking piece 66. From the container closure body-receiving zone 88 up to the container closure body discharge zone 90, the container closure body 10 is conveyed under the condition where it is locked maintaining a predetermined angle owing to the locking action of the upstream-side locking piece 64 and the downstream-side locking piece 66, and is then introduced into the piercing device 4 very stably maintaining a predetermined angle condition.

With reference to FIG. 1, the piercing device 4 in the diagramed system is equipped with a stationary supporting shaft 96 extending substantially vertically and a rotary supporting member 98 that is rotatably mounted on the stationary supporting shaft 96. On the rotary supporting member 98 are arranged a plurality of container closure body-receiving plates 100 at an equal distance in the circumferential direction, and the container closure bodies 10 introduced from the first rotary container closure body conveyor apparatus 2 are placed on these container closure body-receiving plate 100. On the rotary supporting member 98 is further disposed a piercing assembly (not shown) for each of the container closure body-receiving plates 100. The piercing assembly is arranged on the container closure body-receiving plate 100 maintaining a freedom of being moved up and down. The rotary supporting member 98 is continuously rotated by a suitable rotary drive source (not shown) such as an electric motor in a direction indicated by arrow 102, and the container closure body 10 introduced into the container closure body-receiving plate 100 at a container closure body-receiving zone 104 corresponding to the container closure body discharge zone 90 of the first rotary container closure body conveyor device 2, is conveyed to a container closure body discharge zone 106 by the rotation of the rotary supporting member 98. In this step, the piercing assembly acts on the container closure body 10 to pierce, for example, two holes 107 in the protruding piece 16 of the container closure body 10 as indicated by two-dot chain lines in FIG. 2-A. In the container closure body discharge zone 106, the container closure body 10 having holes 107 pierced in the protruding piece 16 is discharged from the piercing device 4 and is introduced into the second rotary container closure body conveyor device 6. Here, the piercing device 4 itself may be the one that is constituted as disclosed in, for example, Japanese Laid-Open Patent Publication No. 15237/19889 or Japanese Laid-Open Patent Publication No. 303639/1990. Therefore, reference should be made to these publications for the details thereof which, however, are not described in this specification.

If desired, the holes 107 may be pierced in the protruding piece 16 at the time when the container closure body 10 is formed from a thin metal plate by the press work or the like (in this case, the piercing device 4 may be omitted).

Figure 8:
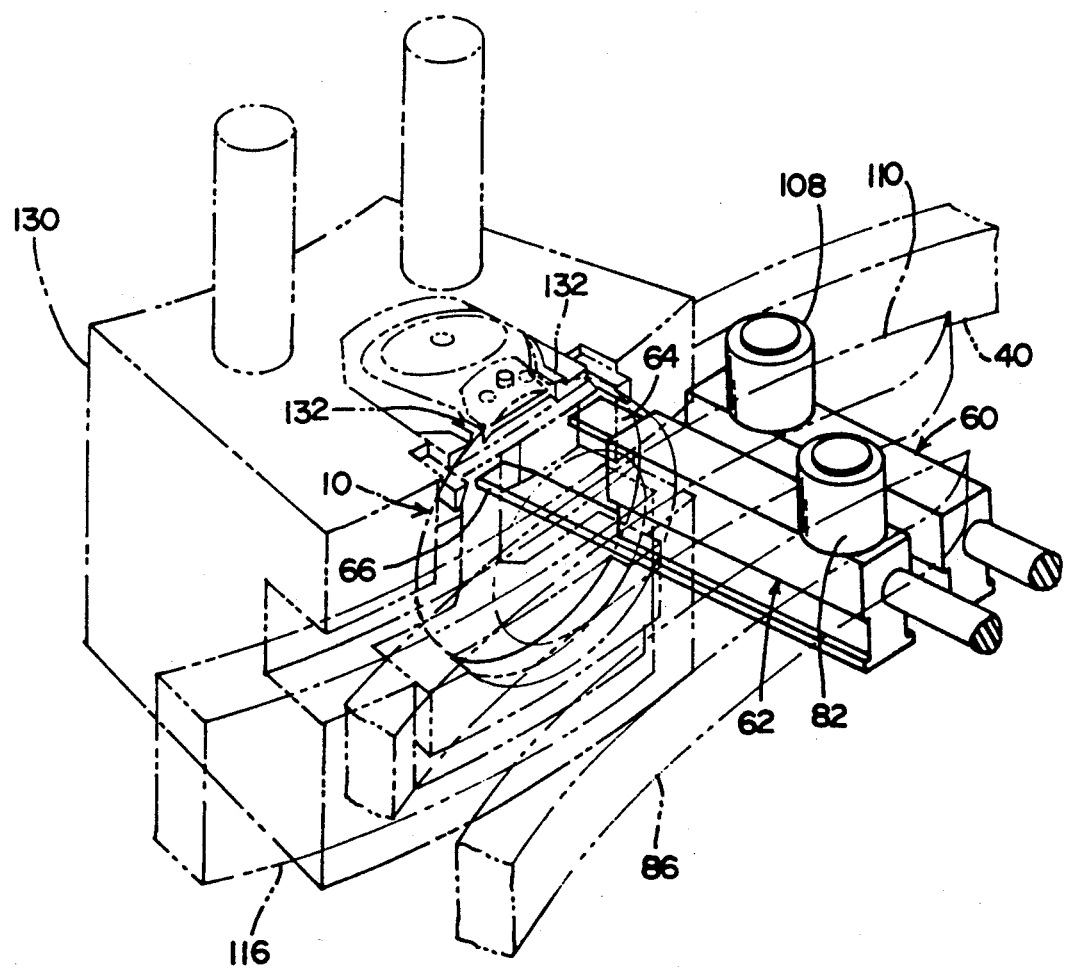
FIG. 8 is a partial perspective view showing a portion of the second rotary container closure body conveyor apparatus in the molding system of FIG. 1.

With reference to FIG. 1, the second rotary container closure body conveyor apparatus 6 is different from the first rotary container closure body conveyor apparatus 2 in regard to the following two points, but is substantially the same as the first rotary container closure body conveyor apparatus 2 in regard to other consrtitution. First, the container closure body 10 is transferred from the piercing device 4 to the second rotary container closure body conveyor apparatus 6 in substantially the same manner as that of the case when the container closure body 10 is transferred from the first rotary container closure body conveyor apparatus 2 to the piercing device 4. Therefore, the end on the upstream side of the stationary guide 40 of the second rotary container closure body conveyor apparatus 6 enters into the groove (which may be of the same type as the annular groove 38 formed in the rotary disc 26 in the first rotary container closure body conveyor apparatus 2) formed in the peripheral surface of the container closure body conveyor apparatus 2) formed in the peripheral surface of the container closure body-receiving plate 100 in the container closure body discharge zone 106 of the piercing device 4. The stationary guide 94 of the piercing device 4 terminates at the upstream side of the container closure body discharge zone 106. In the container closure body discharge zone 106, therefore, the stationary guide 40 of the second rotary container closure body conveyor apparatus 6 works to discharge the container closure body 10 from the container closure body-receiving plate 100 of the piercing device 4, so that it is introduced into the second rotary container closure body conveyor apparatus 6 or, more specifically, into the container closure body-receiving portion 36 formed in the rotary disc 26. Second, in the second rotary container closure body conveyor apparatus 6 as shown in FIG. 8, a cam roller 108 is also rotatably mounted on the upper surface of the slide block 60 that has the upstream-side locking piece 64. In the container closure body discharge zone 114 of the second rotary container closure body conveyor apparatus 6, furthermore, a stationary cam 110 is disposed above the rotary disc 26 in relation to the cam roller 108.

In the second rotary container closure body conveyor apparatus 6 with reference to FIGS. 1 and 8, the container closure body 10 discharged from the piercing device 4 is introduced into the container closure body-receiving portion 36 moving inwardly from the outside thereof in the radial direction in a container closure body-receiving zone 112 that corresponds to the container closure body discharge zone 106 of the piercing device 4. At the time of introduction, the upstream-side locking piece 64 is protruded to the acting position. As the stationary cam 84 acts upon the cam roller 82, however, the downstream-side locking piece 66 moves to the retreated position, and transfer of the container closure body 10 is interfered by neither the upstream-side locking piece 64 nor the downstream-side locking piece 66. As the container closure body-receiving portion 36 separates away from the container closure body-receiving zone 112 by the rotation of the rotary disc 26 in the direction indicated by arrow 28, the cam roller 82 separates away from the stationary cam 84, the downstream-side locking piece 66 protrudes to the acting position, and the protruding piece 16 of the container closure body 10 is reliably held between the upstream-side locking piece 64 and the downstream-side locking piece 66 preventing the container closure body 10 from rotating. At the time when the container closure body-receiving portion 36 passes through the container closure body discharge zone 114 by the rotation of the rotary disc 26, the stationary cam 86 acts upon the cam roller 82 causing the downstream-side locking piece 66 to be located at the retreated position, and at the same time, the stationary cam 110 acts upon the cam roller 108 causing the upstream-side locking piece 64 to be located at the retreated position (the reason for moving the upstream-side locking piece 64 to the retreated position will be described later). The stationary guide 40 of the second rotary container closure body conveyor apparatus 6 terminates at the upstream side of the container closure body discharge zone 114 where the end on the upstream side of the stationary guide 116 of the compression molding apparatus 8 enters into the annular groove 38 of the rotary disc 26. Owing to the action of the end on the upstream side of the stationary guide 116, the container closure body 10 is discharged from the container closure body-receiving portion 36 of the rotary disc 26 in the second rotary container closure body conveyor apparatus 6 and is then transferred to the compression molding apparatus 8.

With reference to FIG. 1, the compression molding apparatus 8 in the molding system is equipped with a rotary compression molding means 118, a plastic material feed means 120 and a discharge means 122. The compression molding means 118 includes a stationary supporting shaft 124 that extends substantially vertically and a rotary supporting member 126 rotatably mounted on the supporting shaft 124. A plurality of molds 128 are arranged on the rotary support member 126 at an equal distance in the circumferential direction. As schematically diagramed in FIG. 8, each mold 128 includes a first mold portion (lower mold portion) 130 onto which is introduced the container closure body 10. The first mold portion 130 has a pair of projections 132 formed at positions on both sides of the protruding piece 16 the container closure body 10 introduced thereon to prevent the container closure body 10 from rotating. If the upstream-side locking piece 64 of the second rotary container closure body conveyor apparatus 6 is not located at the retreated position but is protruded to the acting position in the container closure body discharge zone 114 of the second rotary container closure body conveyor apparatus 6, the tip of the upstream-side locking piece 64 comes in collision with the projection 132 formed on the first mold portion 130 of the compression molding means 118 in the compression molding apparatus 10. In the second rotary container closure body conveyor apparatus 8 of the diagramed embodiment, therefore, not only the downstream-side locking piece 66 but also the upstream-side locking piece 64 are forced to the retreated positions in the container closure body discharge zone 114.

With reference to FIG. 1, the rotary compression molding apparatus 118 is continuously rotated in the direction indicated by arrow 134, and the molds 128 are successively conveyed through a container closure body-receiving zone 136, a plastic material-receiving zone 138, a compression molding zone 140 and a discharge zone 142. In the container closure body-receiving zone 136 that faces the container closure body discharge region 114 of the second rotary container closure body conveyor apparatus 6, the container closure body 10 is introduced onto the first mold portion 130 of the mold 128 as described above. In the plastic material-receiving zone 138, the heat-molten plastic material is fed to the mold 128. When the mold 128 is conveyed through the compression molding zone 140, the plastic material is compression-molded into a grip member 152 (FIGS. 9-A and 9-B) of a required shape and is further linked to the protruding piece 16 of the container closure body 10. In the discharge zone 142, the container closure having plastic grip member 152 is discharged from the mold 128. The discharge means 122 is constituted by a conveyor belt mechanism that includes an endless conveyor belt 146 driven in a direction indicated by arrow 144. A change-over lever 148 is disposed over the endless conveyor belt 146 so as to be selectively switched to the non-acting position indicated by a solid line and to the acting position indicated by a two-dot chain line. When the container closure produced as desired is discharged onto the endless conveyor belt 146 from the mold 128, the change-over lever 148 is located at the non-acting position indicated by the solid line. In this case, the container closure discharged onto the endless conveyor belt 146 is carried by the endless belt 146 to a predetermined zone (e.g., inspection, counting or packaging zone). When the container closure discharged from the mold 128 is an incomplete or a defective one, the change-over lever 148 is located to the acting position indicated by the two-dot chain line. In this case, the container closure discharged onto the endless conveyor belt 146 is not conveyed on the endless conveyor belt 146 but is introduced into a recovery box 150 by the action of the change-over lever 148.

FIGS. 9-A and 9-B illustrate the container closure having plastic grip member 152 formed as desired by the compression molding means 118. The grip member 152 prepared by compression-molding a suitable plastic material such as a polypropylene or a polyethylene has a linking base portion 154 and a ring portion 156 that downwardly extends from the linking base portion 154. The linking base portion 154 of the grip member 152 surrounds the free end of protruding piece 16 of the container closure body 10 and is integrally linked thereto. The plastic material to be molded into the grip member 152 flows into the holes 107 (FIG. 2-A) formed in the protruding piece 16 of the container closure body 10 and is hardened therein. Therefore, the grip member 152 is linked to the protruding piece 16 of the container closure body 10 very strongly. Holes 157 are formed in the lower surface of linking base portion 154 of the grip member 152 to reach the lower surface of the protruding piece 16. It is important that the holes 157 in the linking base portion 154 and the holes 107 in the protruding piece 16 are offset relative to each other (the holes 157 will be further described later).

Next, the compression molding apparatus 8 and, particularly, the compression molding means 118 will be described in detail with reference to FIG. 10. The rotary compression molding means 118 in the compression molding apparatus 8 is provided with a nearly disc-shaped stationary supporting block 158 to which the stationary supporting shaft 124 is secured. At the lower end of the supporting shaft 124 is formed an annular flange 160 which is inserted in a cavity 162 formed in the upper surface of the support block 158 and is secured to the supporting block 158 by means of clamping bolts 164. A rotary supporting member 126 has nearly a cylindrical shape which surrounds the supporting shaft 124, and is rotatably mounted, via an upper bearing 166 and a lower bearing 168, on a support structure which consists of the supporting block 158 and the supporting shaft 124 secured thereto. To the lower end of the rotary supporting member 126 is fixed an input gear 170 which is drivingly coupled to a drive source 172 that may be an electric motor via a suitable transmission mechanism (not shown). When the drive source 172 is energized, the rotary supporting member 126 is rotated at a predetermined speed in a direction indicated by arrow 134 in FIG. 1.

Figure 12:
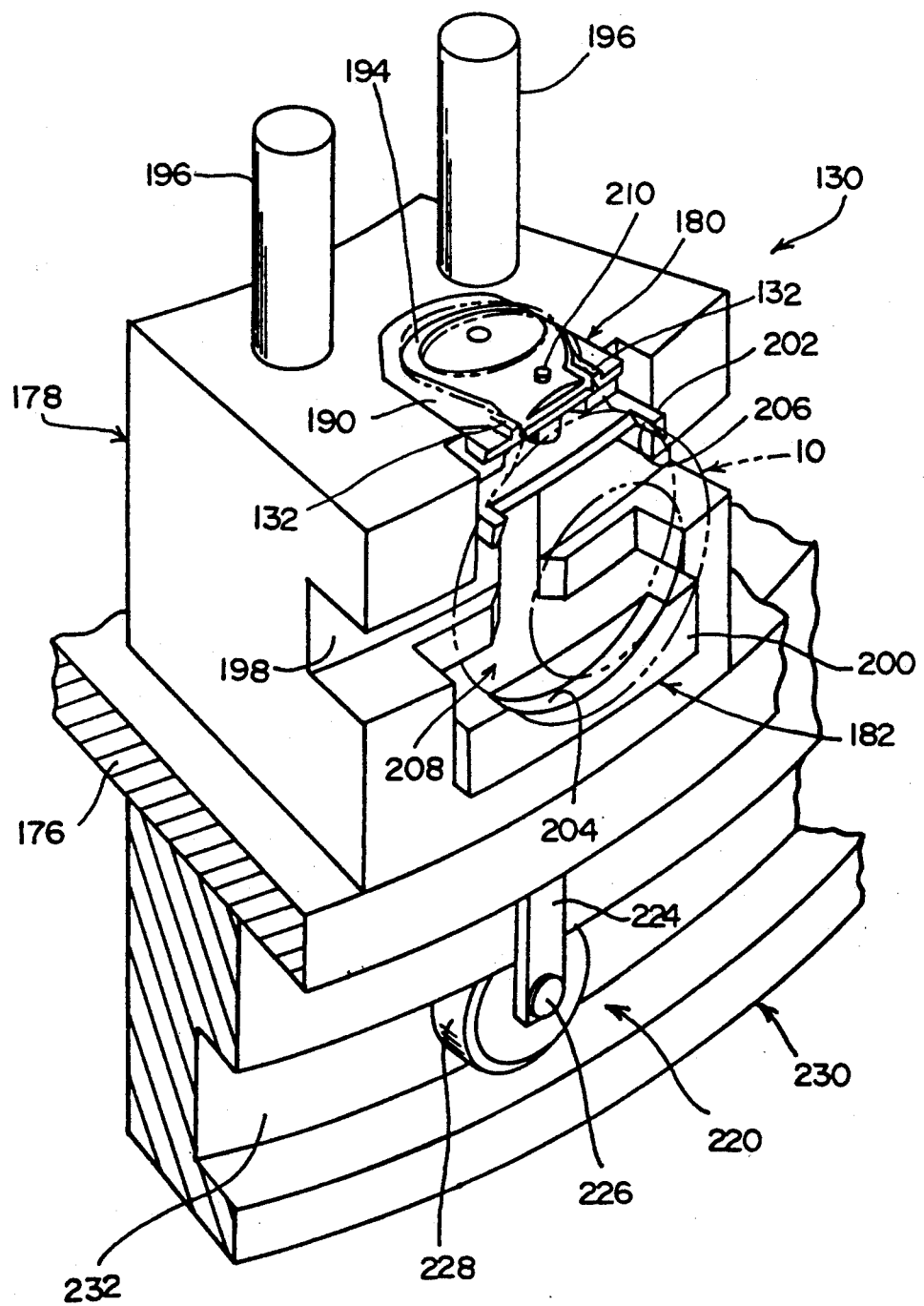
FIG. 12 is a perspective view showing a first mold portion of the mold in the compression molding means of FIG. 10.
Figure 13:
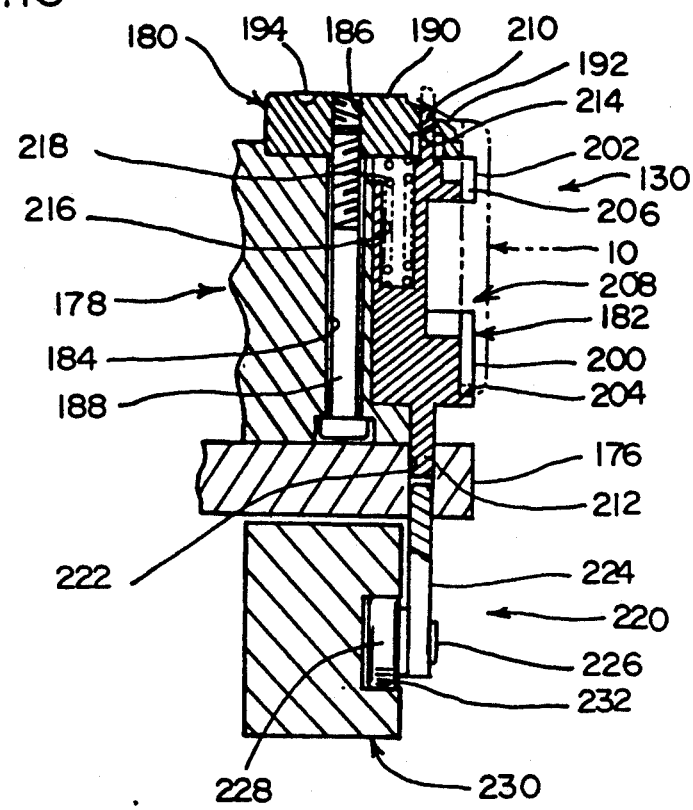
FIG. 13 is sectional view of the first mold portion of FIG. 12.

On the rotary supporting member 126 are mounted a plurality of the molds 128 (twelve molds as shown in FIG. 1 in the diagramed embodiment) at an equal distance in the circumferential direction. Each mold 128 includes of a first mold portion (lower mold portion) 130 and a second mold portion (upper mold portion) 174. In further detail, at the lower portion of the rotary supporting member 126 is formed an annular supporting flange 176 of which the upper surface are secured the first mold portions 130 of the molds 128. With reference to FIGS. 12 and 13, each first mold portion 130 is constituted by a supporting member 178, a mold member 180 and a moving member 182. A circular hole 184 is formed in the supporting member 178 penetrating therethrough vertically, a threaded hole 186 is formed in the mold member 180 penetrating therethrough vertically in match with the above circular hole 184, and a clamping bolt 188 is screwed into the threaded hole 186 through the circular hole 184 to secure the mold member 180 to the supporting member 178. The supporting member 178 itself is secured to a predetermined position of the annular supporting flange 176 by screwing the clamping bolts (not shown) to the supporting member 178 via the annular support flange 176. A horizontal portion 190 that extends substantially horizontally and a tilted portion 192 that is downwardly tilted slightly toward the outside in the radial direction from the horizontal portion 190 exist on the upper surface of the mold member 178 in the first mold portion 130. A first mold cavity 194 is formed extending in the form of a ring from the tilted portion 192 toward the horizontal portion 190. The aforementioned pair of projections 132 are formed on the horizontal portion 190. On the upper surface of the supporting member 178 are further provided a pair of short shafts 196 that upwardly protrude substantially vertically on both sides in the circumferential direction of the first mold cavity 194.

With reference to FIGS. 12 and 13, a groove 198 extending substantially horizontally and arcuately is formed in the front surface or in the outer peripheral surface of the supporting member 178 in the first mold porion 130. Furthermore, a recessed portion is formed in the outer peripheral surface of the supporting member 178 at a central portion thereof in the circumferential direction, so that the moving member 182 can be fitted thereto. The depth of the recessed portion in the radial direction is greater than the depth of the groove 198 in the radial direction. On the front surface of the moving member 182 are disposed a lower receiving portion 200 and an upper locking portion 202, the lower receiving portion 200 having an arcuate supporting surface 204 that is formed being faced upwards and the upper locking portion 202 having a pair of arcuate locking surfaces 206 that are faced to each other with an interval in the circumferential direction. The curvatures of the supporting surface 204 and of the locking surfaces 206 correspond to the curvature of the skirt wall 14 of the container closure body 10. The supporting surface 204 and the locking surfaces 206 define an accommodation space 208 that receives the container closure body 10. The intermediate zone in the up-and-down direction between the lower receiving portion 200 and the upper lock portion 202 is inwardly retreated in the radial direction. The retreated surface in the intermediate zone is substantially in match in the radial direction with the bottom surface in the radial direction of the groove 198 formed in the support member 178 or is positioned slightly inwardly in the radial direction. At the central portion on the upper surface of the moving member 182 is formed a support projection 210 upwardly protruding substantially vertically. Furthermore, at the central portion on the lower surface of the moving member 182 is formed a hanging piece 212 that downwardly protrudes substantially vertically. On the other hand, a through hole 214 is formed in the front surface of the mold member 180 to extend in the vertical direction. As clearly diagramed in FIGS. 12 and 13, the moving member 182 has the support projection 210 inserted in the through hole 214 formed in the mold member 180, has the hanging piece 212 positioned in front of the supporting member 178, and is thus fitted to the recessed portion formed in the supporting member 178. The moving member 182 is mounted to move between the mold position indicated by solid lines in FIGS. 12 and 13 and a separated position indicated by a two-dot chain line in FIG. 13 in the verical direction (i.e., in the direction in which the first mold portion 130 and the second mold portion 174 of the mold 128 open and close). It is important that the support projection 210 formed on the upper surface of the moving member 182 upwardly protrudes beyond the upper surface of the mold member 180, i.e., beyond the bottom surface of the first mold cavity 194 formed therein even when the moving member 182 is located at the mold position. Referring to FIG. 13, a blind hole 216 is formed in the rear portion of the moving member 182 downwardly extending from the upper surface thereof, and a resiliently urging means 218 which may be a compression coil spring is accommodated in the blind hole 216. The resiliently urging means 218 has its upper end which is in contact with the lower surface of the mold member 180, and resiliently urges the mold member downwardly relative to the mold member 180, i.e. toward the molding position indicated by a solid line in FIGS. 12 and 13. A cam mechanism 220 is disposed in relation to the moving member 182 of each of the first mold portions 130 and constitutes a moving member-moving mechanism together with the above resiliently urging means 218. With reference to FIGS. 12 and 13, a through hole 222 is formed in the annular supporting flange 176 of the rotary supporting member 126 to extend in the vertical direction in match with the hanging piece 212 of the moving member 182. The hanging piece 212 of the moving member 182 is inserted in the through hole 222. A cam rod 224, too, is inserted, in the through hole 222 formed in the annular supporting flange 176. The cam rod 224 downwardly protrudes beyond the lower surface of the annular supporting flange 176 and has a horizontal short shaft 226 secured to the lower end thereof. A cam roller 228 is rotatably mounted to the short shaft 226. An annular stationary cam member 230 is disposed under the annular supporting flange 176. The stationary cam member 230 is secured to the supporting block 158 (FIG. 10) via a suitable supporting member (not shown). An annular cam groove 232 is formed in the outer peripheral surface of the stationary cam member 230, and the cam roller 228 is accommodated in the cam groove 232. Under the ordinary condition as indicated by a solid line in FIGS. 12 and 13, the top end of the cam rod 224 is positioned slightly under the lower end of the hanging piece 212 of the moving member 182 and whereby the moving member 182 is located at the mold position being resiliently urged by the resiliently urging means. On the other hand, when the grip member 152 molded together with the container closure body 10 is to be discharged from the first mold piece 130, the cam rod 224 is raised to raise the moving member 182 to the separated position indicated by two-dot chain line in FIG. 13 (reference should also be made to FIG. 21) against the resiliently urging action of the resiliently urging means 218, as will be further described later. When the container closure body 10 is to be fed to the mold 128 in the container closure body-receiving zone 136, the moving member 182 is returned to the mold position, and as shown by a two-dot chain line in FIGS. 12 and 13, the container closure body 10 is accommodated in the accommodation space 208 with its top panel wall 12 being outwardly faced in the radial direction, its linking protruding piece 16 being upwardly faced and its skirt wall 14 being placed on the supporting surface 204. The locking surfaces 206 are brought close to or in contact with the outer peripheral surface of the skirt wall 14. The linking protruding piece 16 of the container closure body 10 extends onto the first mold cavity 194 formed in the upper surface of the mold member 180 and is supported by the support projection 210 of the moving member 182. The support projection 210 that upwardly protrudes beyond the upper surface of the mold member 180 works to support the linking protruding piece 16 of the container closure body 10 and to maintain it under the condition where it is upwardly separated from the bottom surface of the first mold cavity 194. The container closure body 10 accommodated in the accommodation space 208 of the first mold portion 130 is prevented from outwardly moving in the radial direction by the stationary guide 116 (FIG. 1) that arcuately extends being juxtaposed to the outer peripheral surface of the first mold portion 130.

Figure 10:
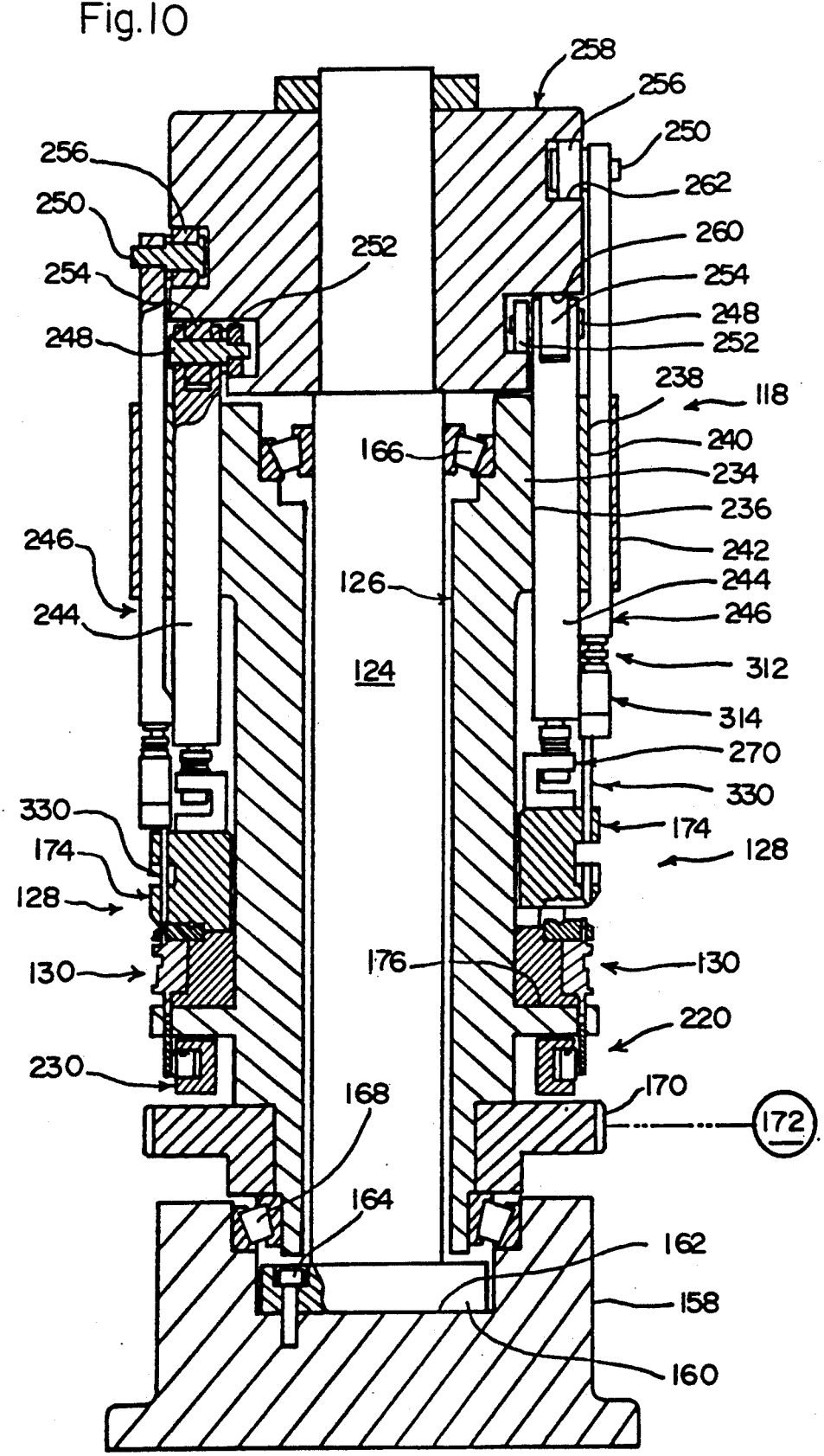
FIG. 10 is a sectional view showing a rotary compression molding means in the compression molding apparatus in the molding system of FIG. 1.

With reference to FIG. 10, a relatively thick supporting flange 234 is formed in the upper portion of the rotary supporting member 126. In the supporting flange 234 is formed a plurality of grooves 236 (twelve grooves in the diagramed embodiment) that extend substantially vertically at an equal distance in the circumferential direction. Each groove 236 is positioned substantially in match with each first mold portion 130 in the vertical direction. Each groove 236 has a rectangular shape in cross section with its outer surface open. A plate-like member 238 is secured to the outer peripheral surface of the supporting flange 234 to correspond to each of the grooves 236. The plate-like member 238 closes the outer surface of the groove 236. A groove 240 that extends substantially vertically is also formed in the outer surface of each of the plate-like member 238. The groove has a rectangular shape in cross section with its outer surface open. Further, a plate-like member 242 is secured to the outer surface of the plate-like member 238 to close the outer surface of the groove 240. The grooves 236 and 240 are arranged in match with each other in the radial direction. A main elevator member 244 is held in each groove 236 for free elevation and lowering, and a subsidiary elevator member 246 is held in each groove 240 for free elevation and lowering. Each of the main elevator member 244 and the subsidiary elevator member 246 extends upwardly beyond the supporting flange 234, and to its upper end portion is fixed shafts 248 and 250 extending substantially horizontally. Rollers 252 and 254 are rotatably mounted on the shaft 248, and a roller 256 is rotatably mounted on the shaft 250. The rollers 252, 254 and 256 constitute a cam follower. On the other hand, a cam block 258 of a nearly cylindrical shape is secured to the upper end of the stationary supporting shaft 124, and cam grooves 260 and 262 are formed on the outer peripheral surface of the cam block 258. The rollers 252 and 254 provided for the main elevator member 244 receive the actions of lower surface and upper surface of the cam groove 260, respectively, and the roller 256 provided for the subsidiary elevator member 246 receives the actions of upper surface and lower surface of the cam groove 262. When the rotary supporting member 126 is rotated in the direction indicated by arrow 134 in FIG. 1, the main elevator member 244 and the subsidiary elevator member 246 move up and down as required.

Figure 11:
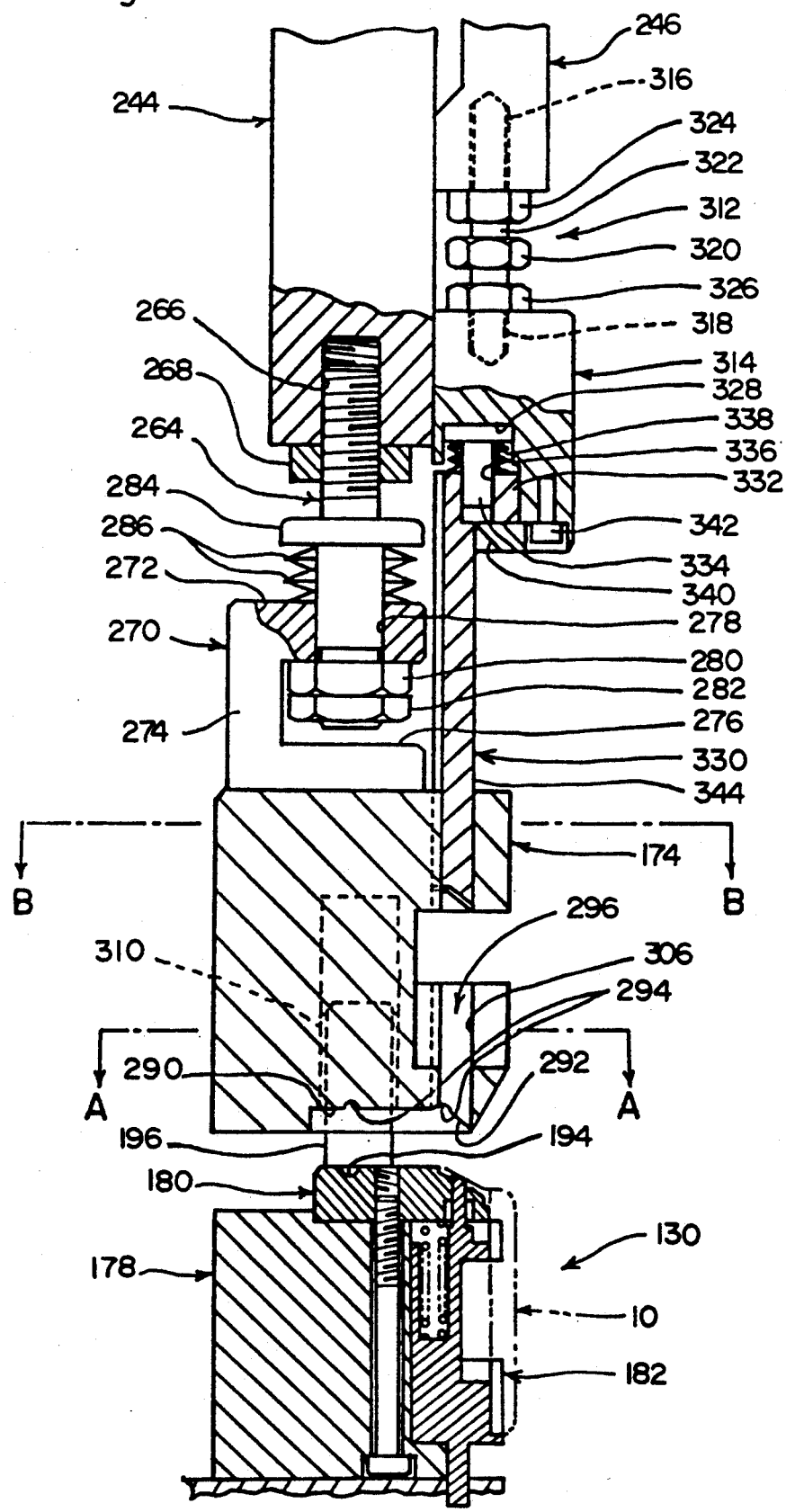
FIG. 11 is a sectional view showing a mold in the compression molding means and related constitution thereof.

With further reference to FIG. 11 together with FIG. 10, a downwardly extending shaft 264 is fixed to the lower end of the main elevator member 244. If described in detail, an internally threaded hole 266 is formed in the main elevator member 244 upwardly extending from the lower end thereof, whereas an external thread is formed in the upper portion of the downwardly extending shaft 264. The external thread of the downwardly extending shaft 264 is screwed into the above internally threaded hole 266, and a locking nut 268 is fitted to the external thread of the downwardly extending shaft 264, so that the downwardly extending shaft 264 is secured to the main elevator member 244. The lower portion of the downwardly extending shaft 264 is provided with a linking member 270 which has a horizontal upper wall portion 272, a vertical wall portion 274 and a horizontal lower wall portion 276. The horizontal upper wall portion 272 has a through hole 278 formed therein and extending in the vertical direction, and the lower portion of the downwardly extending shaft 264 is slidably inserted in the through hole 278. The lower portion of the downwardly extending shaft 264 is externally threaded, and nuts 280 and 282 are fitted to the external thread, so that the linking member 270 is prevented from coming out of the downwardly extending shaft 264. A buldged flange 284 is integrally formed on the downwardly extending shaft 264 at an intermediate portion thereof in the up-and-down direction, and a plurality of coned disc springs 286 are disposed between the above flange 284 and the upper surface of the horizontal upper wall portion 272 of the linking member 270. The coned disc springs 286 work to resiliently urge the coupling member 270 downwards so that the lower surface of the horizntal upper wall portion 272 is resiliently held at a diagrmed position to come in contact with the nut 280.

Figure 14:
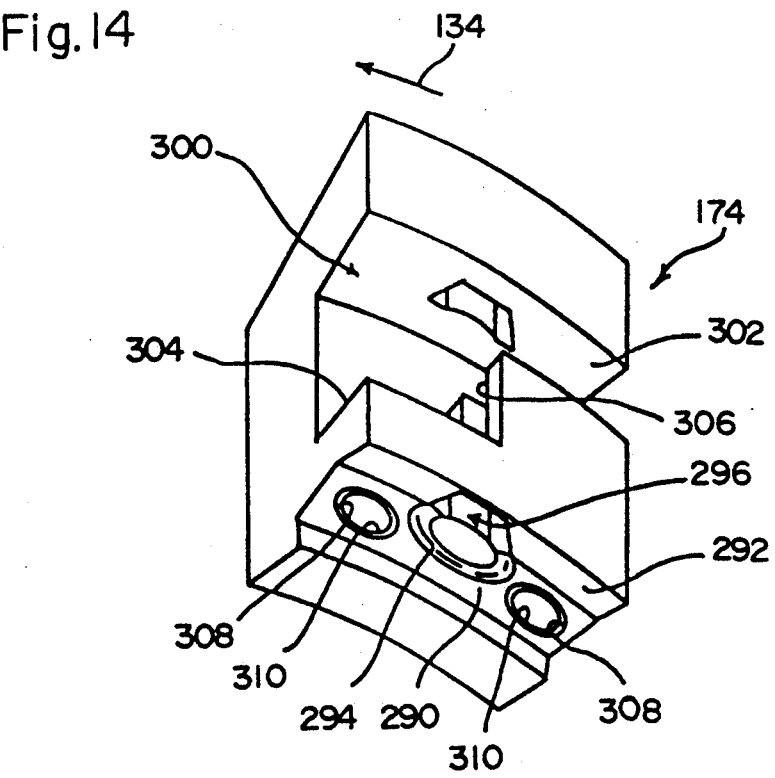
FIG. 14 is a perspective view showing a second mold portion of the mold in the compression molding means of FIG. 10.
Figure 15:
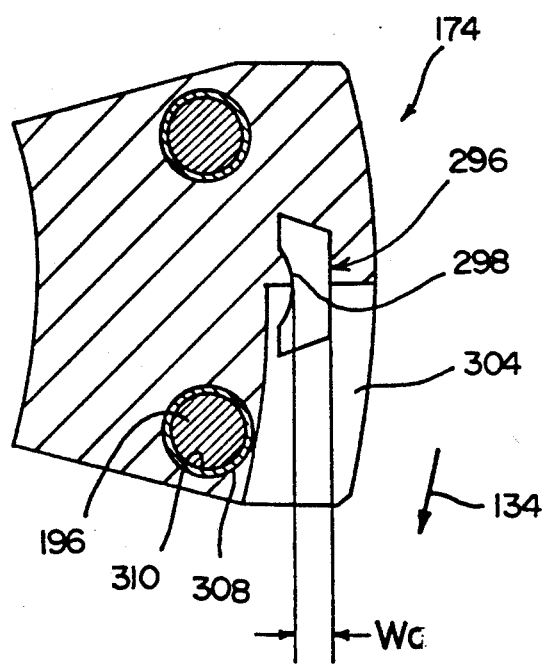
FIG. 15 is a sectional view along line A—A of FIG. 11.
Figure 16:
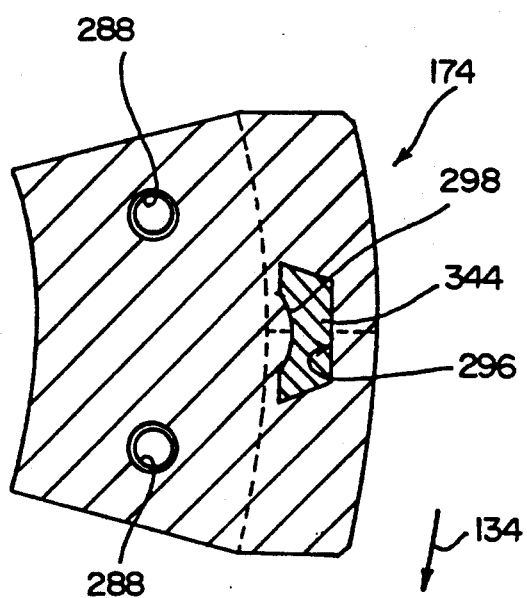
FIG. 16 is a sectional view along the line B—B of FIG. 11.

The second mold portion 174 is secured to the lower surface of the horizontal lower wall portion 276 of the linking member 270. This is accomplished by screwing a clamping bolt (not shown) into an internally threaded hole 288 (FIG. 16) that is formed in the second mold portion 174 to downwardly extend from the upper surface thereof penetrating through the horizontal lower wall portion 276 of the linking member 270. With reference to FIGS. 14 to 16 together with FIG. 11, the second mold portion 174 is nearly fan-shaped. On the lower surface of the second mold portion 174, there exist a main portion 290 that extends substantially horizontally and a tilted portion 292 that is slightly downwardly tilted outwardly in the radial direction from the main portion 290. The main portion 290 and the tilted portion 292 correspond, respectively, to the main portion 190 and the tilted portion 192 in the upper surface of the first mold portion 174. In the lower surface of the second mold portion 174 is formed the second mold cavity 294 that extends in the form of a ring. As will be described later, when the second mold portion 174 is lowered and the lower surface of the second mold portion 174 comes into intimate contact with the upper surface of the first mold portion 130, the second mold cavity 294 formed in the second mold portion 174 defines a mold space in cooperation with the first mold cavity 194 that is formed in the first mold portion 130. The linking protruding piece 16 of the container closure body 10 fed into the first mold portion 130 enters into the mold space from the outside in the radial direction. In the second mold portion 174 is further formed a through introduction hole 296 that extends substantially vertically from the outside in the radial direction of the second mold cavity 294. As clearly diagramed in FIGS. 15 and 16, the through introduction hole 296 has nearly a trapezoidal shape in cross section and has an arcuate protruded portion 298 at the center on the inner side (bottom of the trapezoid) in the radial direction thereof. Therefore, the through introduction hole 296 has in the intermediate portion thereof a minimum-width portion where the size in the radial direction, i.e. the width becomes the smallest ($W_2$) as viewed in a conveying direction indicated by arrow 134. As clearly diagramed in FIG. 14, a relatively large notch 300 is formed in the outer peripheral surface of the second mold portion 174. The notch 300 has nearly an L-shape as a whole and is comprised of an entire circumferential notch 302 that extends over the entire circumferential direction in the outer peripheral surface of the second mold portion 174 and a half circumferential notch 304 that exists only in the front half portion in the outer peripheral surface of the second mold portion 174 in the conveying direction below the entire circumferential notch 302. The entire circumferential notch 302 permits the entire circumference of the through introduction hole 296 to be opened. The half circumferential notch 304 permits the front half in the conveying direction of the through introduction hole 296 to be opened. This portion of the through introduction hole 296, i.e., the front portion in the conveying direction opened by the half circimferential notch 304, constitutes a plastic material-receiving portion 306 for receiving the heat-softened plastic material as will be described later in detail. As will be comprehended with reference to FIG. 11 together with FIGS. 14 and 15, the second mold portion 174 has a pair of holes 308 that upwardly extend substantially vertically from the main portion 290 on the lower surface thereof on both sides in the circumferential direction of the second mold cavity 294 that is formed in the lower surface thereof, and metallic bushes 310 are forcibly fitted into the holes 308. As shown in FIG. 11, a pair of short shafts 196 provided for the first mold portion 130 are inserted in the pair of metallic bushes 310, whereby the first mold portion 130 and the second mold portion 174 are positioned relative to each other as required to cooperate relative to each other.

With further reference to FIGS. 10 and 11, a downwardly extending member 314 is linked to the lower end of the subsidiary elevator member 246 via an adjusting mechanism 312. If described in detail, an internally threaded hole 316 is formed in the subsidiary elevator member 246 upwardly extending from the lower surface thereof, and an internally threaded hole 318 is formed in the downwardly extending member 314 downwardly extending from the upper surface thereof. A right-handed thread is formed in the internally threaded hole 316 and a left-handed thread is formed in the internally threaded hole 318. A shaft member 322 that has a hexagonal flange portion 320 integrally formed in the intermediate portion thereof in the up-and-down direction, has a right-handed thread formed on the upper half portion thereof and a left-handed thread formed on the lower half portion thereof. The upper half of the shaft member 322 is screwed into the internally threaded hole 316 of the subsidiary elevator member 246 and is secured by a locking nut 324, and the lower half of the shaft member 322 is screwed into the internally threaded hole 318 of the downwardly extending member 314 and is clamped by a locking nut 326. When the locking nuts 324 and 326 are loosened and the shaft member 322 is turned in the clockwise direction, the downwardly extending member 314 (i.e., compression rod 330 that will be described later) is raised with respect to the subsidiary elevator member 246. Conversely, when the shaft member 322 is turned in the counterclockwise direction, the downwardly extending member 314 (i.e., compression rod 330 described later) is lowered with respect to the subsidiary elevator member 246. A notch 328 which is downwardly opened is formed in the lower portion in the radial direction of the downwardly extending member 314. An enlarged head 332 of the compression rod 330 is held in the notch 328. A guide pin 334 having a shaft that extends downwardly and substantially vertically is secured into the notch 328, a through guided hole 336 extending in the vertical direction is formed in the expanded head 332 of the compression rod 330, and a shaft of the guide pin 334 is slidably inserted in the through guided hole 336. A plurality of plate springs 338 are arranged around the shaft portion of the guide pin 334. The plate springs 338 resiliently urge the compression rod 330 downwardly. A stop plate 340 is fastened by bolt 342 to the lower surface of the downwardly extending member 314 at a position below the enlarged head 332 of the compression rod 330. The lower surface of the enlarged head 332 of the compression rod 330 comes in contact with the stop plate 340 to restrict the downward movement of the compression rod 330. The compression rod 330 has a main rod portion 344 that downwardly extends beyond the stop plate 340 and the main rod portion 344 is inserted in the through introduction hole 296. As shown in FIG. 15, the main rod portion 344 of the compression rod 330 has a cross sectional shape that is substantially identical to the cross sectional shape of the through introduction hole 296.

Figure 17:
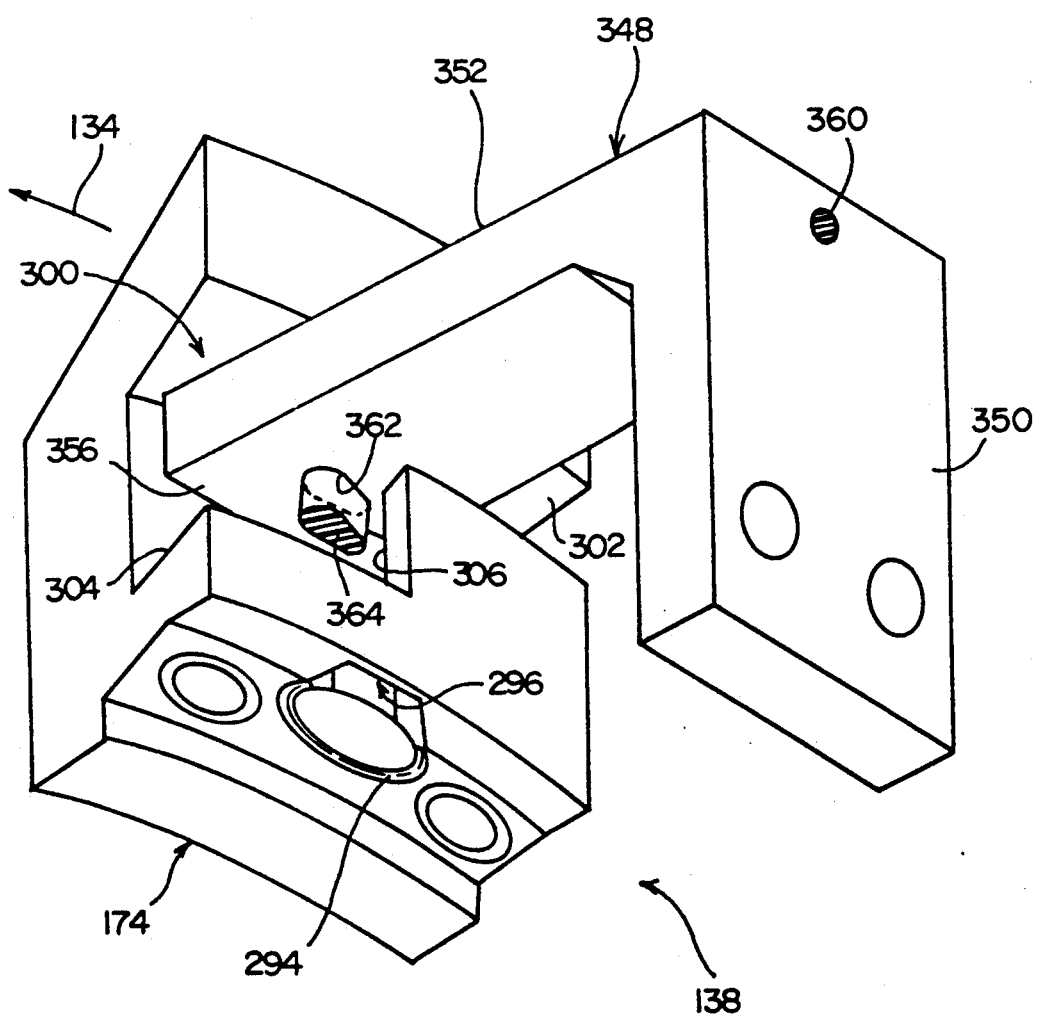
FIG. 17 is a partial perspective view showing a plastic maaterial-receiving zone of the compression molding apparatus in the molding system of FIG. 1.
Figure 18:
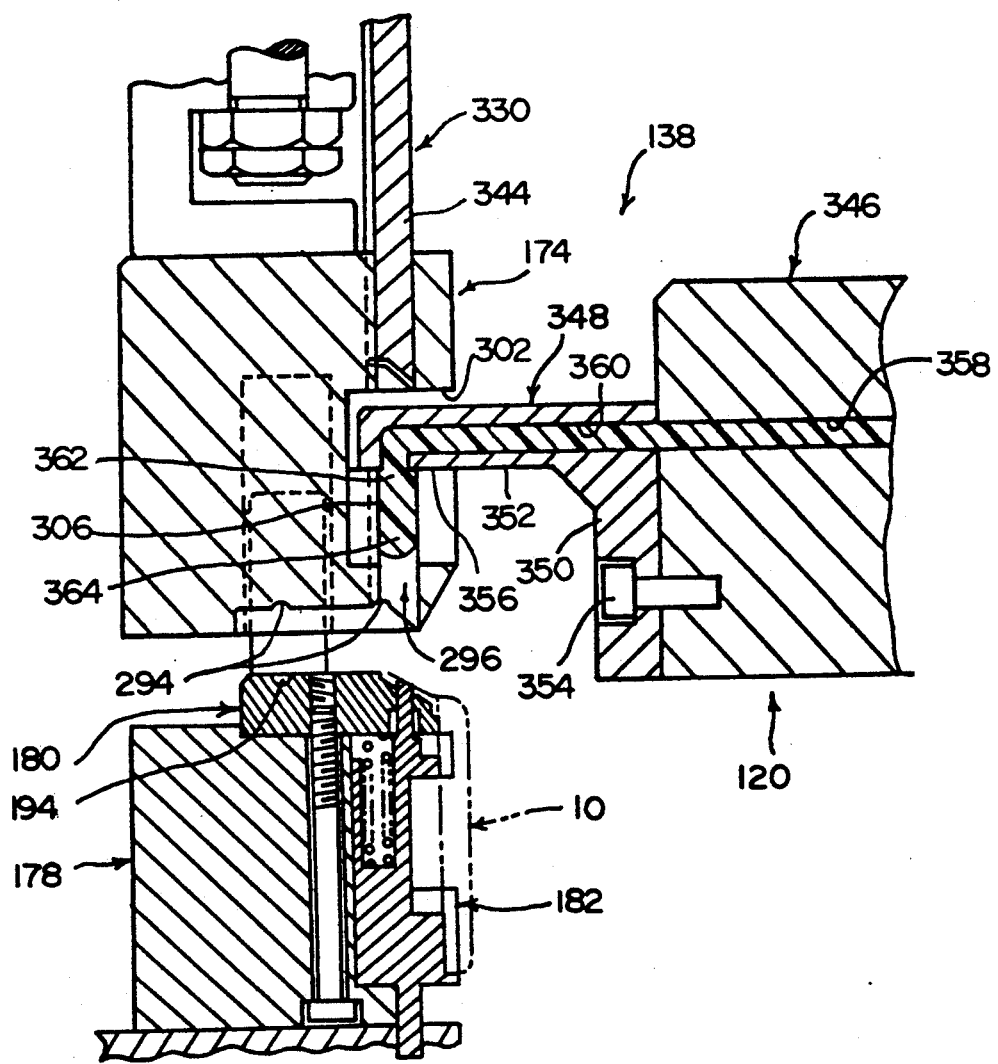
FIG. 18 is a partial sectional view showing the plastic material-receiving zone of the compression molding apparatus in the molding system of FIG. 1.

With reference to FIGS. 17 and 18 together with FIG. 1, the plastic material feed means 120 arranged in relation to the plastic material-receiving zone 138 includes an extruder body 346 and an extrusion block 348 secured to the end of the extruder body 346. The extrusion block 348 has a base portion 350 that extends substantially vertically and a projecting portion 352 that extends substantially horizontally from the upper end of the base portion 350. A clamping bolt 354 is screwed into the surface at the end of the extruder body 346 through the lower portion of the base portion 350, whereby the extrusion block 348 is secured to the end of the extruder body 346. The projecting portion 352 of the extrusion block 348 has a lower surface 356 that extends substantially horizontally. An extrusion passage 360 is formed in the extrusion block 348 extending through the projecting portion 352 from the inlet end connected to the downstream end of the extrusion passage 358 formed in the extruder body 346. The extrusion passage 360 extends through the projecting portion 352 up to an end portion thereof substantially horizontally from the inlet end and, then, extends downwardly up to the lower surface 356 where it is opened. An extrusion port 362 of the extrusion passage 360 opened in the lower surface 356 extends slenderly in the direction in which the second mold portion 174 is conveyed, i.e., in the direction indicated by arrow 134, and is gradually broadened toward the downstream as viewed in the conveying direction.

Operation in the plastic material-receiving zone 138 will be described. When passing through the plastic material-receiving zone 138, the constituent elements of the mold 128 are located at positions shown in FIG. 18. That is, the second mold portion 174 mounted on the main elevator member 244 is located at an elevated position upwardly separated away from the first mold portion 130, and the compression rod 330 mounted on the subsidiary elevator member 246 is elevated in a manner that the lower end of the main rod portion 344 thereof is located over the entire circumferential notch 302 formed in the second mold portion 174. As will be understood with reference to FIG. 17 together with FIG. 18, the projecting portion 352 of the extrusion block 348 in the plastic material feed means 120 projects into the entire circumferential notch 302 formed in the outer peripheral surface of the second mold portion 174, and the lower surface 356 having the extrusion opening 362 is located in contact with or close to the upper surface of the plastic material-receiving portion 306 of the through introduction hole 296. When the plastic material-receiving portion 306 of the through introduction hole 296 moves in a direction indicated by arrow 134 by the rotation of the rotary supporting member 126, the plastic material 364 downwardly extruded from the extrusion opening 362 of the extrusion block 348 is received by the plastic material-receiving portion 306 through the front half portion that is opened in the conveying direction in the plastic material-receiving portion 306. As the plastic material-receiving portion 306 further moves in the direction indicated by arrow 134, the plastic material 364 received by the plastic material-receiving portion 306 is cut by the cutting action performed by the lower surface 356 of projecting portion 352 of extrusion block 348 in cooperation with the upper surface of plastic material-receiving portion 306. Thus, the plastic material 364 is fed into the plastic material-receiving portion 306 and is moved together therewith.

Figure 19:
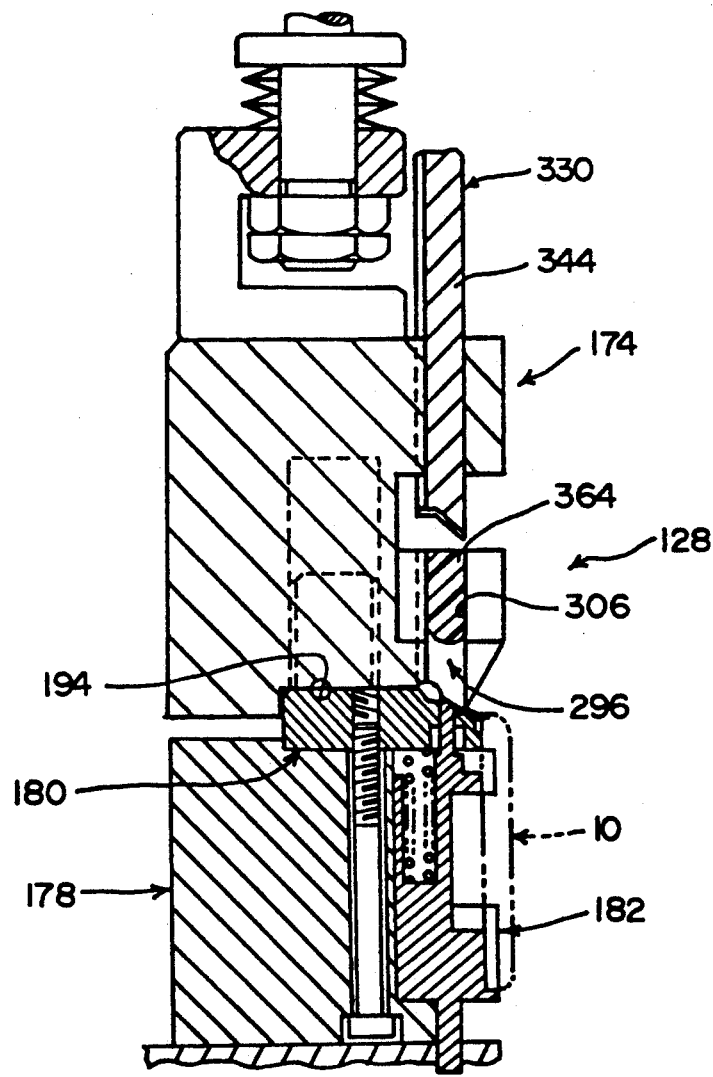
FIG. 19 is a partial sectional view showing the condition at the upstream end in the compression molding zone of the compression molding apparatus in the molding system of FIG. 1.
Figure 20:
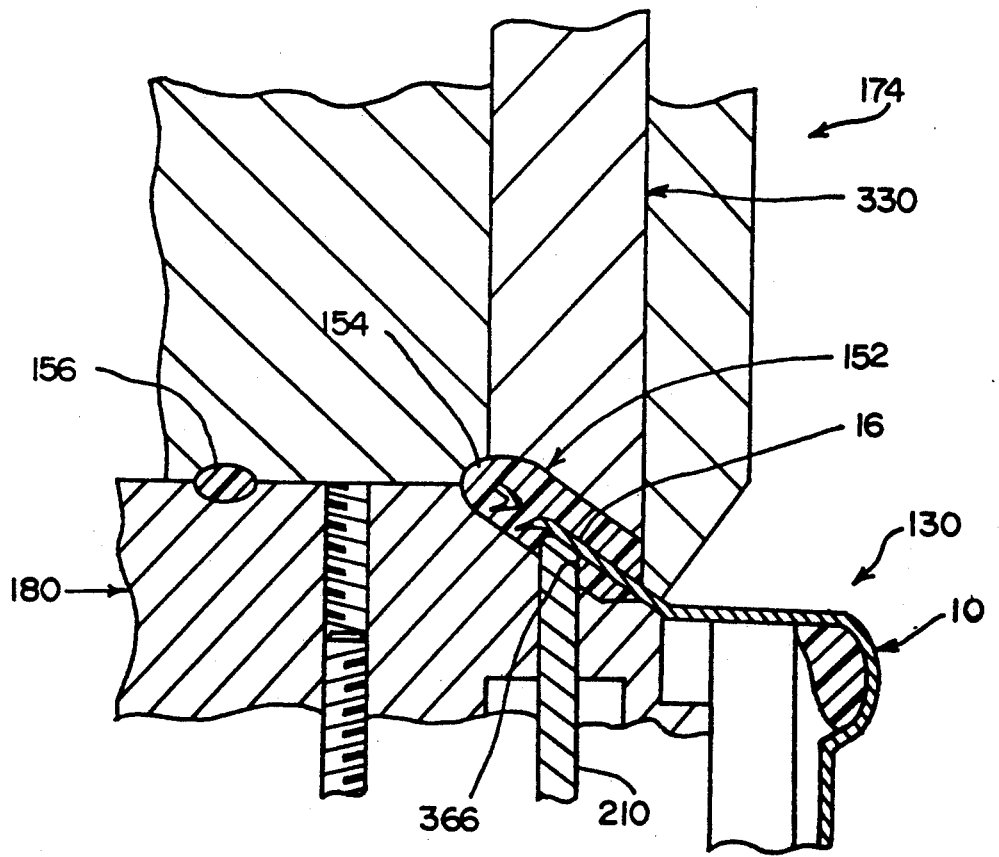
FIG. 20 is a partial sectional view showing the condition in which the plastic material is compression-molded into a desired grip member using the mold in the compression molding means of FIG. 10.

With further reference to FIGS. 19 and 20 together with FIGS. 1 and 10, the main elevator member 244 and the subsidiary elevator member 246 are suitably lowered at the time when the mold 128 of the compression molding means 118 passes through the compression molding zone 140. Under the condition shown in FIG. 19, the second mold portion 174 is lowered as the main elevator member 244 lowers, the lower surface of the second mold portion 174 comes into intimate contact with the first mold portion 130, and a mold space that extends in the form of a ring is defined by the first mold portion 130 and the second mold portion 174 in cooperation with each other. On the other hand, the lower end of main rod portion 344 of the compression rod 330 is located above the plastic material-receiving portion 306 (the plastic material 364 has been already received by the plastic material-receiving portion 306) in the through introduction hole 296. The subsidiary elevator member 246 further continues to descend until the compression rod 330 reaches a position shown in FIG. 20. At this moment, the main rod portion 344 of the compression rod 330 acts upon the plastic material 364 that exists in the plastic material-receiving portion 306 so that the plastic material 364 is forcibly compressed into the mold space through the introduction hole 296. Thus, the plastic material 364 is molded into a shape corresponding to the mold space, i.e., molded into the grip member 152 shown in FIGS. 9-A and 9-B. At the same time, since the protruding piece 16 of the container closure body 10 protrudes into the mold space, the linking base portion 154 of the molded grip member 152 surrounds the end portion of the protruding piece 16, whereby the grip member 152 is integrally linked to the protruding piece 16. As is well known to those skilled in the art, it is very difficult, if not impossible, to precisely control the amount of the resin material 364 to be fed to the plastic material-receiving portion 306 to a predetermined value; i.e., error is envolved to some extent in the amount of the plastic material 364. In the diagramed embodiment, the plastic material 364 that is fed is set in a slightly excess amount. The excess amount of the plastic material 364 is compensated at the final step of compression molding as the compression rod 330 slightly elevates against the resilient urging action of the disc springs 338.

As will be easily comprehended with reference to FIGS. 19 and 20, at a moment when the plastic material 364 is forced into the mold space from the through introduction hole 296 by the action of main rod portion 344 of the compression rod 330, the plastic material 364 comes in collision with the upper surface of the protruding piece 16 that protrudes into the mold space. Therefore, a pressure acts on the protruding piece 16 to force it down. In the compression molding apparatus 8 improved according to the present invention, however, the support projection 210 formed on the moving member 182 of the first mold portion 130 protrudes upwardly from the bottom surface of the first mold cavity 194, and the protruding piece 16 of the container closure body 10 is supported by the support projection 210. It is important that the support projection 115 is positioned being offset relative to the hole 107 (FIG. 2-A) in the protruding piece 16. Therefore, the protruding piece 16 is downwardly forced by the pressure applied thereto from the plastic material 364 and is reliably blocked from being brought in contact with or close to the bottom surface of the first mold cavity 194. That is, the protruding piece 16 is reliably maintained under the condition where it is separated away from the bottom surface of the first mold cavity 194. Therefore, the plastic material 364 that is forced into the mold space from the through introduction hole 296 is allowed to flow sufficiently even into the side of the lower surface of the protruding piece 16 to fully surround it, and is molded into a favorable grip member 152 as desired. Here, since the protruding piece 16 is maintained supported by the support projection 210, a hole 157 extending up to the protruding piece 16 as clearly shown in FIG. 9-B is formed in the lower surface side of the linking base portion 154 of the molded grip member 152. Since the hole 157 exists in the lower surface side of the linking base portion 154, it does not impair the appearance of the grip member 152. The plastic material necessary for forming the grip member 152 can be saved by an amount equal to the volume of the hole 157.

When no support projection 210 is disposed on the moving member 182 of the first mold portion 130, on the other hand, the protruding piece 16 is downwardly forced by the pressure applied thereto from the plastic material 364 that flew into the mold space and is brought into contact with or close to the bottom surface of the first mold cavity 194. In this case, the plastic material 364 does not flow sufficiently into the side of the lower surface of the protruding piece 16, and the lower surface side of the protruding piece 16 is covered with an insufficient amount of the plastic material or the lower surface of the protruding piece 16 is locally exposed, resulting frequently in the formation of defective products.

Figure 21:
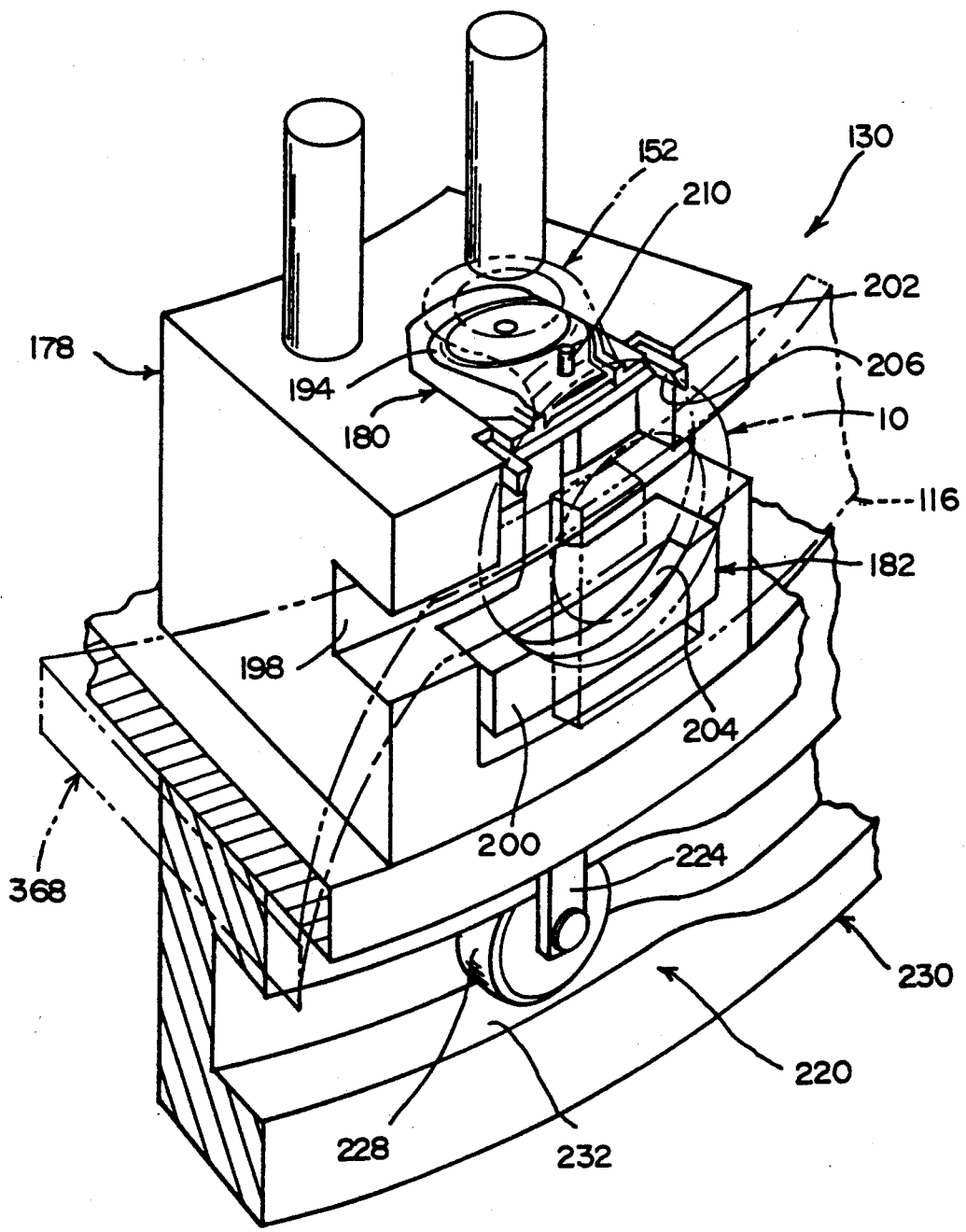
FIG. 21 is a partial perspective view showing the condition of the first mold portion of FIG. 12 from which the container closure is being discharged.

With reference to FIG. 21 together with FIGS. 1, 12 and 13, at the time when the mold 128 moves from the compression molding zone 140 up to the discharge zone 142, the main elevator member 244 and the subsidiary elevator member 246 (FIG. 11) are raised, the second mold portion 174 and the compression rod 330 are upwardly separated away from the first mold portion 130, and the mold 128 is opened (the container closure body 10 and the compression-molded grip member 152 exist on the first mold portion 130). In the first mold portion 130, furthermore, the moving member 182 is raised to a separated position indicated by a two-dot chain line in FIG. 13 and by a solid line in FIG. 21 by the action of the cam mechanism 220. Then, the supporting surface 204 of the moving member 182 acts on the skirt wall 14 of the container closure body 10 and the support projection 210 acts on the protruding piece 16 of the container closure body 10 to slightly raise the container closure body 10. Due to this raise, the compression-molded grip member 152 too, is raised, from the first mold cavity 194 in the first mold portion 130 and is separated upwards, establishing the condition where the container closure body 10 and the molded grip member 152 are allowed to be discharged very easily from the first mold portion 130.

In order to prevent the container closure body 10 from outwardly escaping from the first mold portion 130 in the radial direction, the downstream end of the stationary guide 116 is positioned on the upstream side of the discharge zone 142 as indicated by a two-dot chain line in FIG. 21, and the stationary guide 116 does not exist in the discharge zone 142. A stationary discharge member 368 is disposed in the discharge zone 142. The guide surface of the discharge member 368 extends gradually and outwardly in the radial direction from the groove 198 formed in the supporting member 178 of the first mold portion 130 and from the upstream end located in the retreated portion between the lower receiving portion 200 and the upper locking portion 202 in the moving member 182. At the time when the mold 128 passes through the discharge zone 142, the container closure body 10 is gradually forced outwardly in the radial direction from the first mold portion 130 by the action of guide surface of the discharge member 368, whereby the container closure having the container closure body 10 and the grip piece 152 integrally linked to the protruding piece 16 is discharged onto an endless conveyor belt 146 (FIG. 1).

In the foregoing was described in detail an embodiment of the compression molding apparatus constituted according to the present invention. However, many words will not be needed to learn that the present invention is in no way limited to the above embodiment only but can be modified or altered in a variety of other ways without departing from the scope of the invention.

In the diagramed embodiment, for instance, the moving member 182 of the first mold portion 130 is provided with a support projection 210 (therefore, the container closure body 10 and the plastic grip member 152 linked to the linking protruding piece 16 are upwardly moved beyond the support projection 210, when discharged). As required, however, the support projection may be disposed at a required position to upwardly protrude from the bottom surface of the first mold cavity 194 of the first mold portion 130. In the diagramed embodiment, furthermore, the moving member 182 in the first mold portion 130 acts on the outer peripheral surface of the skirt wall 14 of container closure body 10. The structure, however, may be so changed that the moving member acts on the inner peripheral surface of the skirt wall 14 instead of on the outer peripheral surface thereof, or that the moving member acts on the inner peripheral surface of the skirt wall 14 in addition to the outer peripheral surface thereof.

What we claim is:

1. A molding apparatus for forming a plastic grip member and, at the same time, linking it integrally to a protruding piece of a container closure body that has a circular top panel wall, a cylindrical skirt wall extending downwardly from a peripheral edge of said top panel wall and said protruding piece protruding from a lower edge of said skirt wall, said molding system comprising:

a rotary container closure body conveyor apparatus for carrying said container closures; wherein said rotary container closure body conveyor apparatus is comprised of a rotary disc that rotates on a central axis extending substantially vertically and has a plurality of container closure body-receiving portions formed on an outer peripheral surface thereof at intervals in the circumferential direction, and a rotation preventing mechanism which prevents the container closure bodies held in the receiving portions from rotating therein;

each of said receiving portions formed in said rotary disc being capable of at least partly holding the top panel wall and the skirt wall of the container closure body which is so placed that the protruding piece thereof is directed upwards;

said rotation preventing mechanism includes a pair of locking pieces disposed on said rotary disc in relation to each of said receiving portions, and each of said pair of locking pieces is constituted by an upstream-side locking piece having a tip that can be positioned being faced to one side edge of the protruding piece of the container closure body on the upstream side of said rotary disc in the direction of rotation thereof and a downstream-side locking piece having a tip that can be positioned being faced to the other side edge of the protruding piece of the container closure body on the downstream side of said rotary disc in the direction of rotation thereof; and at least said downstream-side locking pieces of said pair of locking pieces are mounted on said rotary disc in a manner to freely move between an acting position at which the tips thereof are positioned being faced to the one side edge of the protruding piece of said container closure body and a retreated position at which the tips thereof are separated away from the protruding piece of said container closure body, and said rotation preventing mechanism further includes a downstream-side locking piece positioning mechanism that selectively positions said downstream-side locking pieces at said acting position and at said retreated position.

2. A molding apparatus according to claim 1, wherein said upstream-side locking pieces of said pair of lock pieces are also mounted on said rotary disc in a manner to move freely between the acting position at which the tips thereof are positioned being faced to the one side edge of the protruding piece of the container closure body and a retreated position at which the tips thereof are separated away from the protruding piece of the container closure body, and said rotation preventing mechanism further includes an upstream-side locking piece positioning mechanism that selectively positions said upstream-side locking pieces at said acting position and at said retreated position.

3. A mold apparatus according to claim 2, wherein each of said downstream-side locking piece positioning mechanism and said upstream-side locking piece positioning mechanism is constituted by a resiliently urging means which resiliently urges said downstream-side locking pieces and said upstream-side locking pieces toward said acting position, and a cam means that forces said downstream-side locking pieces and said upstream-side locking pieces to said retreated position against the resilient urging action of said resiliently urging means.

4. A mold apparatus according to claim 1, wherein the upstream-side edge at the tip of said downstream-side locking piece of each of said pair of locking pieces is tilted on the downstream side toward the tip thereof.

5. A molding apparatus for forming a plastic grip member and, at the same time, linking the plastic grip member integrally to a protruding piece of a container closure body that has a circular top panel wall, a cylindrical skirt wall extending downwardly from a peripheral edge of said top wall and said protruding piece protruding from a lower edge of said skirt wall, said molding apparatus comprising:
- a compression molding assembly equipped with a mold which consists of a first mold portion and a second mold portion that are opened and closed by being moved relative to each other in predetermined opening and closing directions; wherein
- said first mold portion has an accommodation space and a first mold cavity;
- said second mold portion has a second mold cavity;
- said first mold cavity and said second mold cavity in cooperation define a mold space for forming a plastic grip member such that,
- when the container closure body is accommodated in said accommodation space of said first mold portion, at least a free end of the linking protruding piece of said container closure body is protruded into said mold space;
- said first mold portion is constituted by a mold member that has said first mold cavity formed therein and a moving member that is mounted thereon to freely move between a mold position and a separated position in said opening and closing directions, said moving member having formed thereon a support surface that supports at least a portion of said skirt wall of said container closure body;
- said compression molding assembly has a moving member-moving mechanism that selectively positions said moving member of said first mold portion at said mold position or at said separated position; and said molding apparatus for forming a plastic grip member being dimensioned and arranged such that
- said grip member is compression-molded while said moving member of said first mold portion is located at said mold position, and such that, when said first mold portion and said second mold portion are opened relatively to each other, simultaneously or subsequently, said moving member is moved to said separated position, so that the resultant molded grip member is separated from said first mold cavity.

6. A molding apparatus according to claim 5, further comprising a compression rod and wherein a through introduction hole extending in a predetermined direction from said mold cavity is formed in said second mold portion, the compression rod is slidably received in said through introduction hole, and the plastic material fed to said through introduction hole is compressed by the compression rod and is molded into the grip member having a shape corresponding to said mold space.

7. A molding apparatus according to claim 6, wherein said moving member of said first mold portion has formed thereon a support projection that protrudes into said first mold cavity even at said molding position to support said linking protruding piece of said container closure body in a manner to separate it away from the bottom surface of said first mold cavity.

8. A molding apparatus according to claim 5, wherein said moving member-moving mechanism is constituted by a resiliently urging means which resiliently urges said moving member toward said mold position, and a cam mechanism which forces said moving member to said separated position against the resilient urging action of said resiliently urging means.

9. A molding apparatus according to claim 8, further comprising a rotary support member that rotates in a predetermined direction, said molds being provided in a plural number on said rotary supporting member at a distance in a circumferential direction, and said molding apparatus further comprising a cam mechanism which includes a stationary cam member that extends along said rotary supporting member.

10. A molding apparatus according to claim 5, wherein the grip member has a linking base portion that surrounds at least a free end of said linking protruding piece of said container closure body and a ring portion that extends in the form of a ring from said linking base portion.

11. A molding apparatus for forming a plastic grip member and, at the same time, linking said plastic grip member integrally to a protruding piece of a container closure body that has a circular top panel wall, a cylindrical skirt wall extending downwardly from a peripheral edge of said top wall and said protruding piece protruding from a lower edge of said skirt wall, said molding apparatus comprising:
- a compression molding assembly equipped with a mold which is comprised of a first mold portion and a second mold portion that are opened and closed by being moved relative to each other in a predetermined opening and closing direction; wherein
- said first mold portion has an accommodation space and a first mold cavity;

said second mold portion has a second mold cavity and a through introduction hole that extends in a predetermined direction from said second mold cavity, and said molding apparatus further comprising a compression rod which is slidably received in said through introduction hole and adapted to compress plastic positioned with the through introduction hole;

said first mold cavity and said second mold cavity, in cooperation, define a mold space for forming a plastic grip member such that, when the container closure body is accommodated in said accommodation space of said first mold portion, at least a free end of the linking protruding piece of the container closure body is protruded into said mold space and, when plastic material is fed into said through introduction hole, the plastic is compressed by said compression rod and the plastic material is molded into the grip member having a shape corresponding to said mold space; and said first mold cavity of said first mold portion has formed thereon at least one support projection that protrudes into said mold space to support the linking protruding piece in a manner to separate it away from a bottom surface of said first mold cavity.

12. A molding apparatus according to claim 11, wherein a plurality of said support projections are formed in said first mold cavity at a distance.

13. A molding apparatus according to claim 11, wherein said molding apparatus is dimensioned and arranged so as to form a grip member that has a linking base portion that surrounds at least the free end of said linking protruding piece and a ring portion that extends in the form of a ring from said linking base portion.

* * * * *